United States Patent
Bakshi et al.

(10) Patent No.: US 6,743,011 B2
(45) Date of Patent: Jun. 1, 2004

(54) MULTI-LAYER BURNER MODULE, ADAPTER, AND ASSEMBLY THEREFOR

(75) Inventors: Shivalik Bakshi, Boston, MA (US); Daniel W. Hawtof, Painted Post, NY (US); John S. Rosettie, Corning, NY (US); Amy L. Rovelstad, Ithaca, NY (US); John Stone, III, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 74 days.

(21) Appl. No.: 10/027,846

(22) Filed: Dec. 19, 2001

(65) Prior Publication Data

US 2003/0113679 A1 Jun. 19, 2003

(51) Int. Cl.$^7$ .......................... F23D 14/48; F23D 14/56
(52) U.S. Cl. ............................ 431/328; 431/8; 431/278
(58) Field of Search ............................ 431/8, 326, 328, 431/350, 278; 65/17.4, 468, 528, 531; 239/548, 552, 553, 590.3, 590.5, 596, 600, 601

(56) References Cited

U.S. PATENT DOCUMENTS

| | | | | |
|---|---|---|---|---|
| 2,295,522 A | * | 9/1942 | Shorter | 239/553.3 |
| 2,365,942 A | * | 12/1944 | Crowe | 431/347 |
| 2,414,873 A | * | 1/1947 | Herbst | 239/549 |
| 2,414,874 A | * | 1/1947 | Herbst | 228/234.1 |
| 2,418,208 A | * | 4/1947 | Walker | 239/553.3 |
| 2,719,581 A | * | 10/1955 | Greathead | 239/132.3 |
| 3,437,415 A | * | 4/1969 | Davis et al. | 431/328 |
| 3,510,238 A | * | 5/1970 | Biber | 431/116 |
| 4,927,714 A | * | 5/1990 | Priceman | 428/628 |
| 5,484,263 A | * | 1/1996 | Nagaraj et al. | 415/200 |

FOREIGN PATENT DOCUMENTS

| | | | |
|---|---|---|---|
| WO | WO 99/32410 | * | 7/1999 |
| WO | WO 00/36340 | * | 6/2000 |

* cited by examiner

*Primary Examiner*—Carl D. Price
(74) *Attorney, Agent, or Firm*—Myers, Bigel, Sibley & Sajovec, P.A.; Randall S. Wayland

(57) ABSTRACT

A burner module for delivering a flow of chemical reactants to a combustion site of a chemical vapor deposition process includes a plurality of substantially planar layers. The substantially planar layers are arranged in a generally parallel and fixed relationship and define an inlet, an outlet and a passage fluidly connecting the inlet and outlet. At least one of the layers is a distribution layer having a plurality of apertures therethrough and fluidly communicating with the passage. The plurality of apertures collectively define a non-uniform pattern arranged and configured to improve the uniformity of a flow out through the outlet. Burner adapter and assembly embodiments are also included.

27 Claims, 28 Drawing Sheets

MULTI-LAYER BURNER MODULE, ADAPTER, AND ASSEMBLY THEREFOR

FIELD OF THE INVENTION

The present invention relates to burner devices, and, more particularly, to burner assemblies, modules and adapters for producing an inorganic soot.

BACKGROUND OF THE INVENTION

It is known to form various articles, such as crucibles, tubing, lenses, and optical waveguides, by reacting a precursor in the flame of a burner to produce a soot and then depositing the soot on a receptor surface. This process is particularly useful for the formation of optical waveguide preforms made from doped and undoped silica soot, including planar waveguides and waveguide fibers.

The waveguide formation process generally involves reacting a silicon-containing precursor in a burner flame generated by a combustible gas, such as a mixture of methane and oxygen, and depositing the silica soot on an appropriately shaped receptor surface. In this process, silicon-containing materials typically are vaporized at a location remote from the burner. The vaporized raw materials are transported to the burner by a carrier gas. There, they are volatilized and hydrolyzed to produce soot particles. The soot particles then collect on the receptor surface. The receptor surface may be a flat substrate in the case of planar waveguide fabrication, a rotating starting rod (bait tube) in the case of vapor axial deposition (VAD) for waveguide fiber fabrication, or a rotating mandrel in the case of outside vapor deposition (OVD) for waveguide fiber fabrication.

Numerous burner designs have been developed for use in vapor delivery precursor processes, and at least one liquid delivery precursor process has been contemplated. Whether the precursor is delivered to the burner in vapor form or liquid form, it is important that the burner receives a distributed, even stream of precursor. This consideration is particularly important during waveguide manufacture to form accurate refractive index profiles.

SUMMARY OF THE INVENTION

According to embodiments of the present invention, a burner module for delivering a flow of chemical reactants to a combustion site of a chemical vapor deposition process includes a plurality of substantially planar layers. The burner modules are generally rectangular is shape such that they may be arranged in side-by-side orientation. The substantially planar layers of the burner module are arranged in a generally parallel and fixed relationship and define an inlet, an outlet and a passage fluidly connecting the inlet and the outlet. At least one of the layers is a distribution layer having a plurality of apertures therethrough and fluidly communicating with the passage. The plurality of apertures collectively define a non-uniform pattern arranged and configured to improve the uniformity of a flow out through the outlet.

According to further embodiments of the present invention, a burner mounting adapter for use with a manifold having a mount surface and first and second fluid supply openings in the mount surface and distributed at different locations along a length of the manifold includes an adapter body. A first inlet aperture, a first outlet aperture and a first connecting passage fluidly connecting the first inlet and outlet apertures are defined in the adapter body. A second inlet aperture, a second outlet aperture and a second connecting passage fluidly connecting the second inlet and outlet apertures are defined in the adapter body. The first and second inlet apertures are arranged and configured to align with the first and second fluid supply openings, respectively, when the burner mounting adapter is mounted on the mount surface of the manifold. The first and second passages extend transversely of the manifold length when the burner mounting adapter is mounted on the mount surface of the manifold. Thus, it should be recognized that the burner mounting adapter connects the macro scale of the manifold to the micro scale of the burner face.

According to further embodiments of the present invention, a burner module for use with a manifold having a mount surface and first and second fluid supply openings in the mount surface and distributed at different locations along a length of the manifold includes a burner mounting adapter. The burner mounting adapter includes an adapter body. A first inlet aperture, a first outlet aperture and a first connecting passage fluidly connecting the first inlet and outlet apertures are defined in the adapter body. A second inlet aperture, a second outlet aperture and a second connecting passage fluidly connecting the second inlet and outlet apertures are defined in the adapter body. The first and second inlet apertures are arranged and configured to align with the first and second fluid supply openings, respectively, when the burner mounting adapter is mounted on the mount surface of the manifold. The first and second passages extend transversely of the manifold length when the burner mounting adapter is mounted on the mount surface of the manifold. A burner face layer overlies the adapter body and the distribution layers. The burner face layer includes at least first and second burner apertures fluidly communicating with the first and second outlet apertures of the adapter body, respectively.

According to further embodiments of the present invention, a burner assembly for delivering a flow of chemical reactants to a combustion site of a chemical vapor deposition process includes a manifold and a burner module. The manifold includes a mount surface with first and second fluid supply openings distributed at different locations along a length of the manifold. The burner module includes a burner mounting adapter including an adapter body. A first inlet aperture, a first outlet aperture and a first connecting passage fluidly connecting the first inlet and outlet apertures are defined in the adapter body. A second inlet aperture, a second outlet aperture and a second connecting passage fluidly connecting the second inlet and outlet apertures are defined in the adapter body. The first and second inlet apertures are arranged and configured to align with the first and second fluid supply openings, respectively, when the burner mounting adapter is mounted on the mount surface of the manifold. The first and second passages extend transversely of the manifold length when the burner mounting adapter is mounted on the mount surface of the manifold. A burner face layer overlies the adapter body. The burner face layer includes at least first and second burner apertures fluidly communicating with the first and second outlet apertures of the adapter body, respectively.

According to further embodiments of the present invention, a burner module for delivering a flow of chemical reactants to a combustion site of a chemical vapor deposition process includes a burner face layer and a reflective layer covering the burner face layer.

Further features, advantages and details of the present invention will be appreciated by those of ordinary skill in the art from a reading of the Figs. and the detailed description of the preferred embodiments which follow, such description being merely illustrative of the present invention.

DETAILED DESCRIPTION OF THE PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 26:
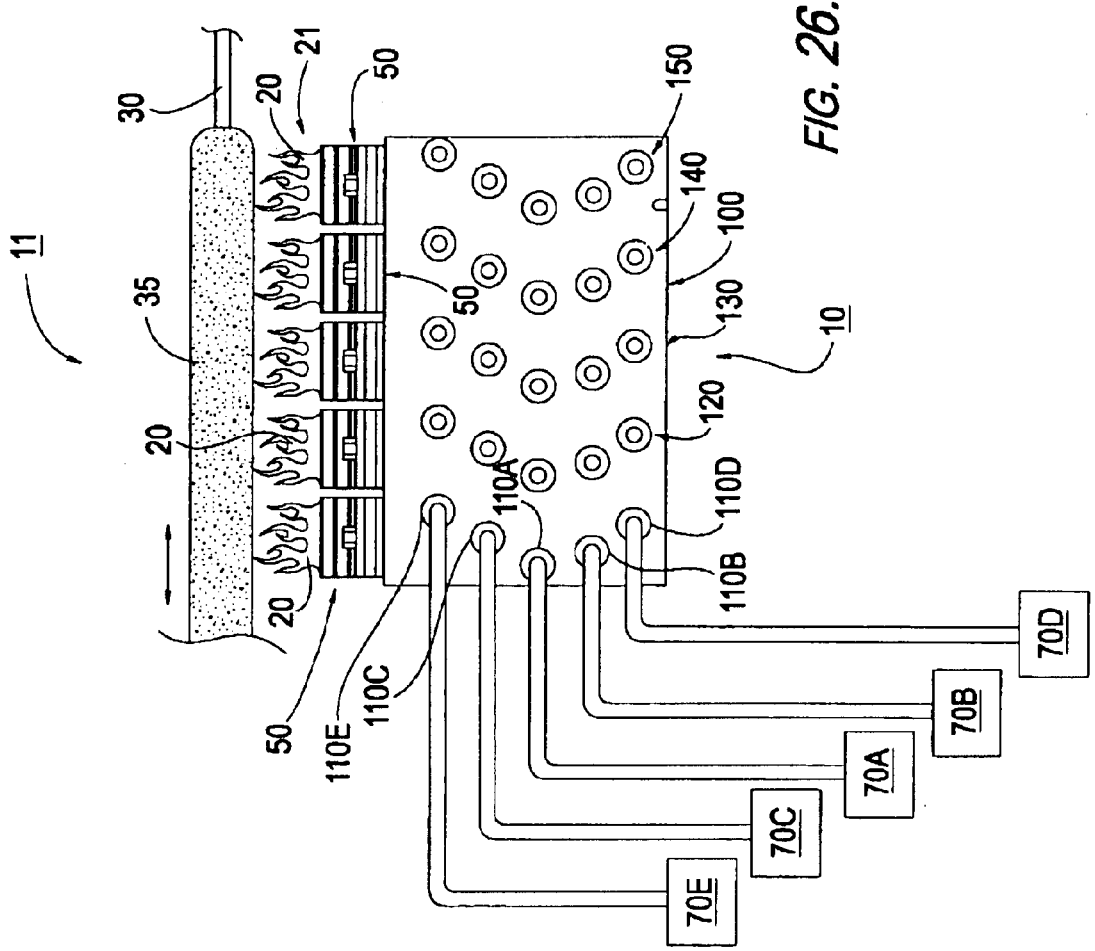
FIG. 26 is a schematic view of a burner system including the burner assembly of FIG. 1.

With reference to FIGS. 1–5 and 26, a burner assembly 10 according to preferred embodiments of the present invention is shown therein. The burner assembly 10 includes a block-shaped manifold 100 and a plurality of rectangular-shaped burner modules 50 mounted on the surface of the manifold 100 by means of fasteners (preferably threaded bolts) 40. Each module 50 includes a mounting adapter 200 and a burner 300. With reference to FIG. 26, the burner assembly 10 may form a part of a burner system 11 operable to provide a flame 20 which may be used to apply a soot deposit 35 onto a bait rod 30 or other suitable substrate (e.g., a glass core cane). In particular, the burner assembly 10 may be used to form a soot preform 33 which may be subsequently consolidated to form a glass preform, from which an optical waveguide fiber may be drawn.

Turning to the manifold 100 in greater detail, the manifold 100 is preferably formed from a unitary block of metal (e.g., steel or aluminum), ceramic or other suitable material. However, the manifold 100 may be assembled from multiple discrete members. The manifold 100 has a top face 102 and opposed side faces 104 and 106. For the purposes of description, the manifold 100 has a lengthwise axis A—A (FIGS. 1 and 3), a lateral axis B—B (see FIGS. 1 and 3), and a vertical axis C—C (see FIG. 5); however, it will be appreciated that the manifold 100 and the burner assembly 10, although preferable to be mounted as such, may be positioned such that the axis C—C is not vertically oriented. The manifold 100 as illustrated is adapted to hold up to five modules 50. Many manifolds may be mounted adjacent to each other along the axis A—A such that large soot preforms may be manufactured. As shown in FIG. 2, a pair of opposed, threaded mounting bores 108 are formed in the top face 102 for each module 50. However, as will be appreciated from the description herein, the manifold 100 may be modified to hold more or fewer of the modules 50. Additionally, as discussed below, fewer of the modules 50 may be mounted on the manifold 100 than the manifold 100 is adapted to hold.

Figure 1:
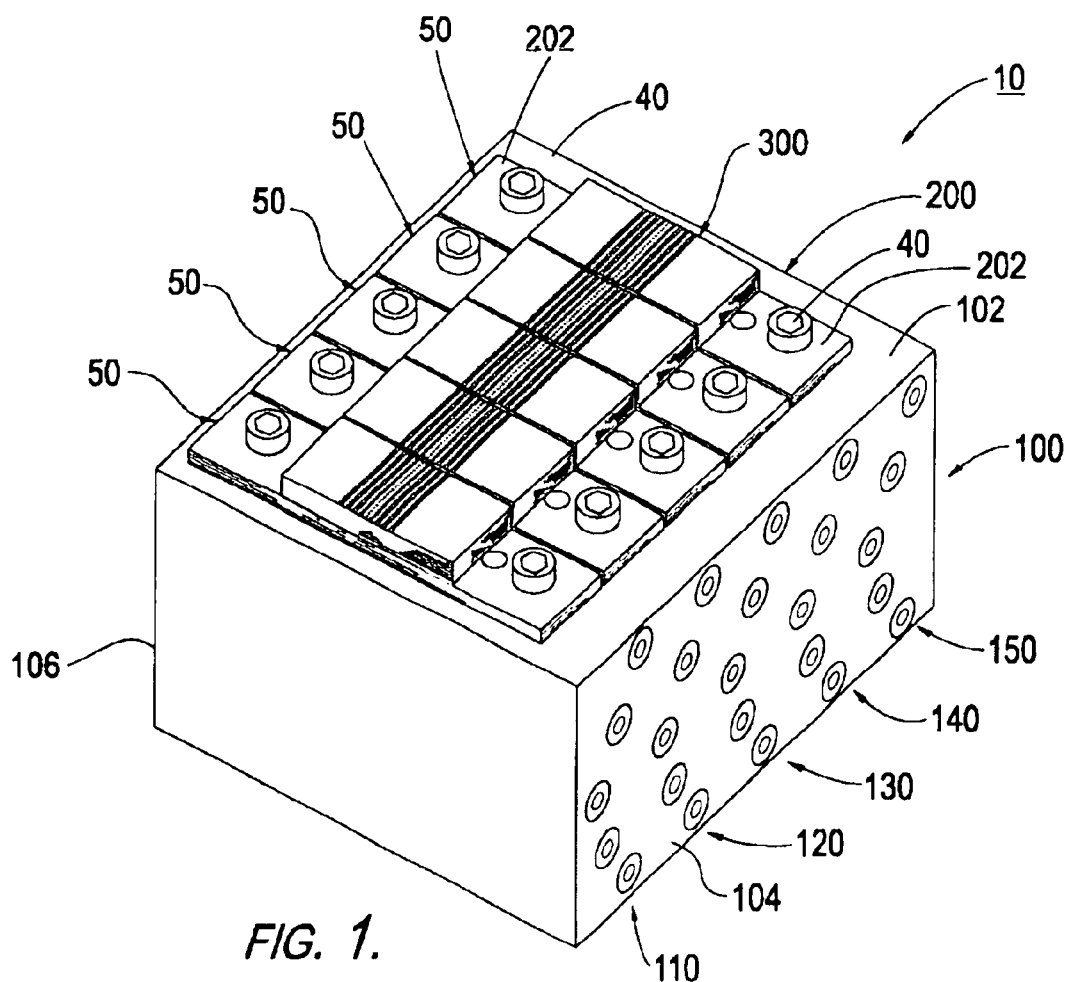
FIG. 1 is a perspective view of a burner assembly according to embodiments of the present invention.
Figure 2:
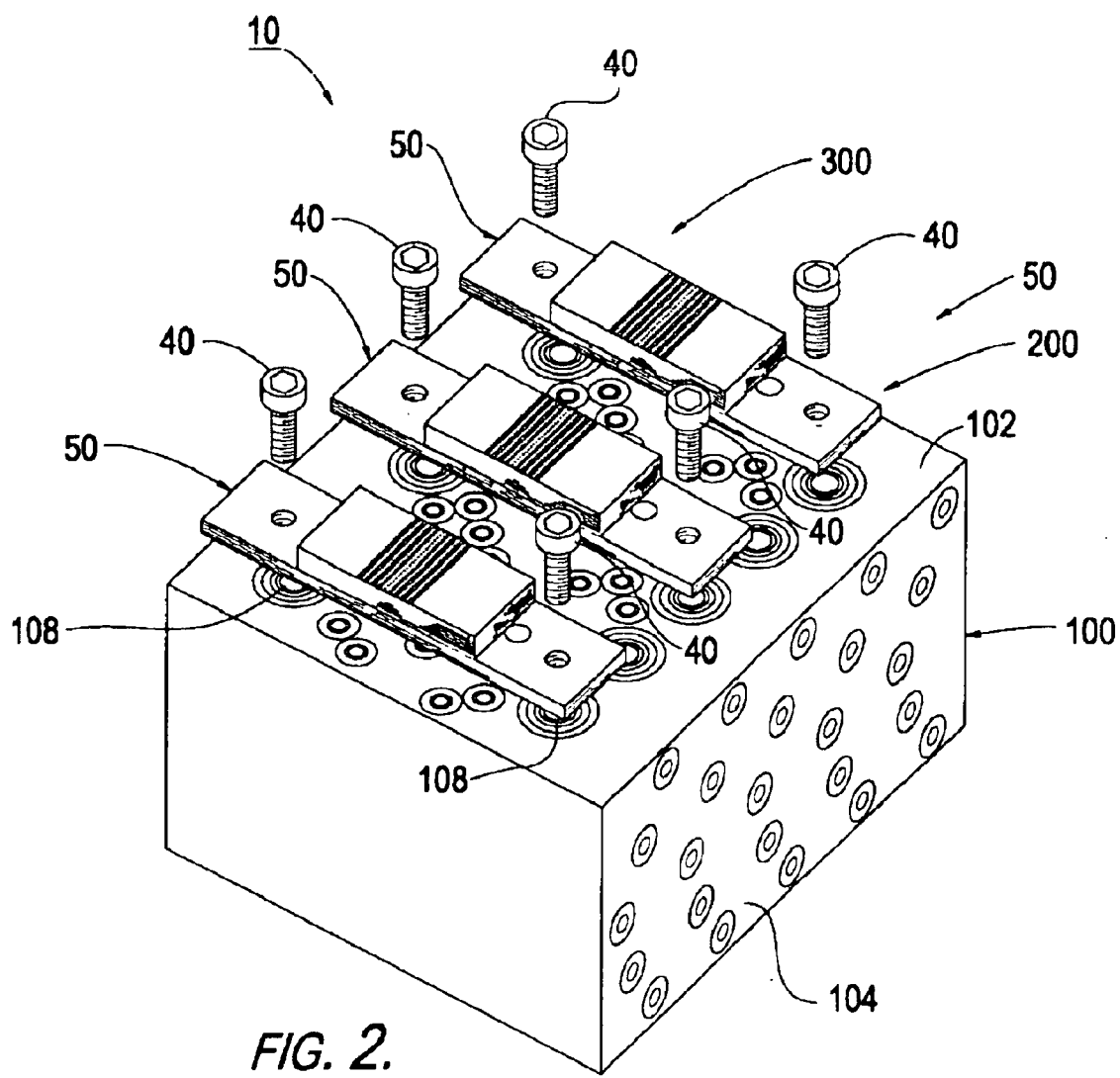
FIG. 2 is a partial exploded, perspective view of the burner assembly of FIG. 1.
Figure 5:
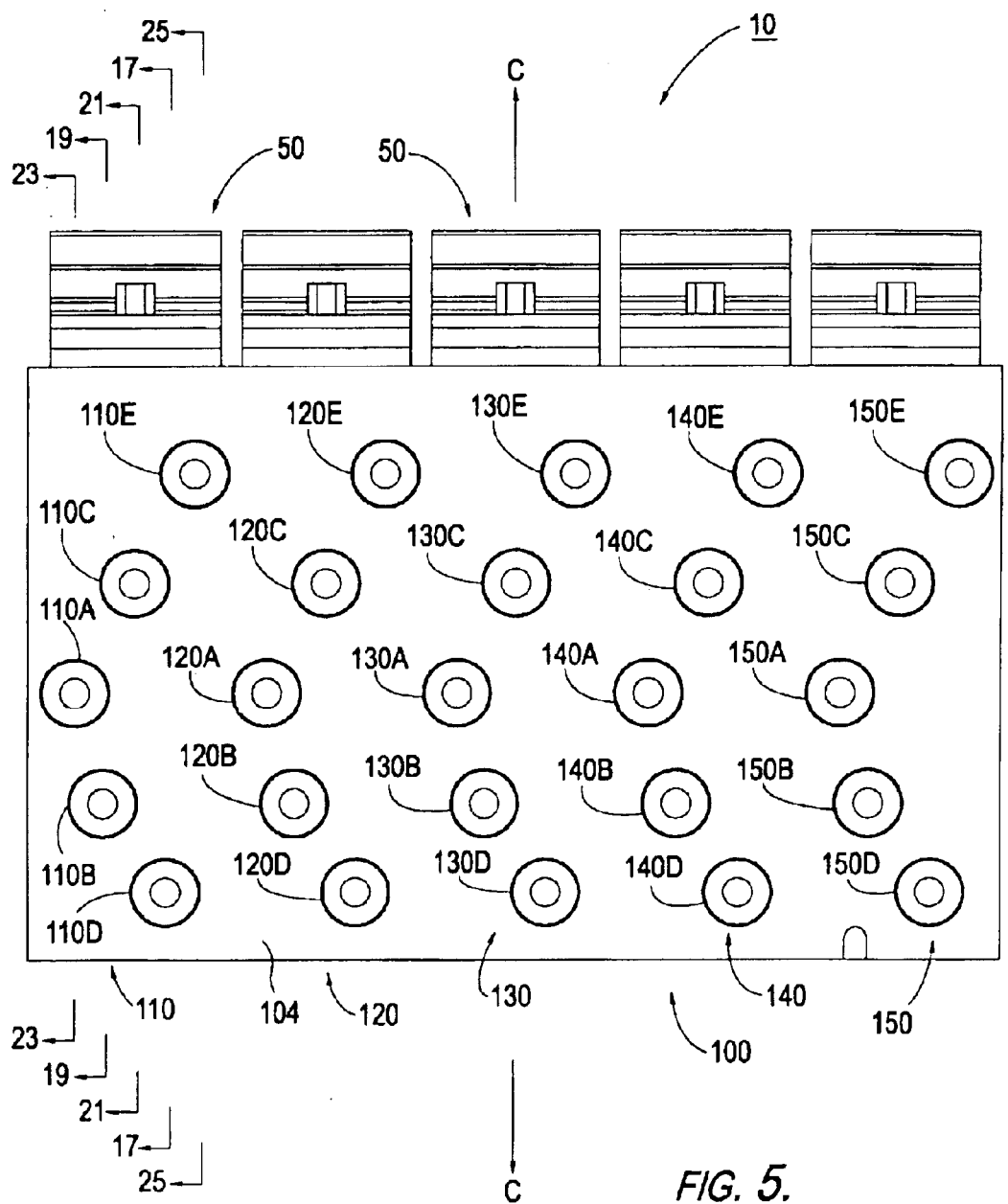
FIG. 5 is a side view of the burner assembly of FIG. 1.

As shown in FIGS. 1 and 5, five sets of inlet openings 110, 120, 130, 140, 150 are formed in the side face 104 and are distributed along the length of the manifold 100. The set 110 includes inlet openings 110A, 110B, 110C, 110D, 110E spaced apart along the height and distributed along the length of the manifold 100. Similarly, the sets 120, 130, 140, and 150 include inlet openings 120A–120E, 130A–130E, 140A–140E, and 150A–150E, respectively, which are arranged in the same manner as the inlet openings 110A–110E.

Figure 6:
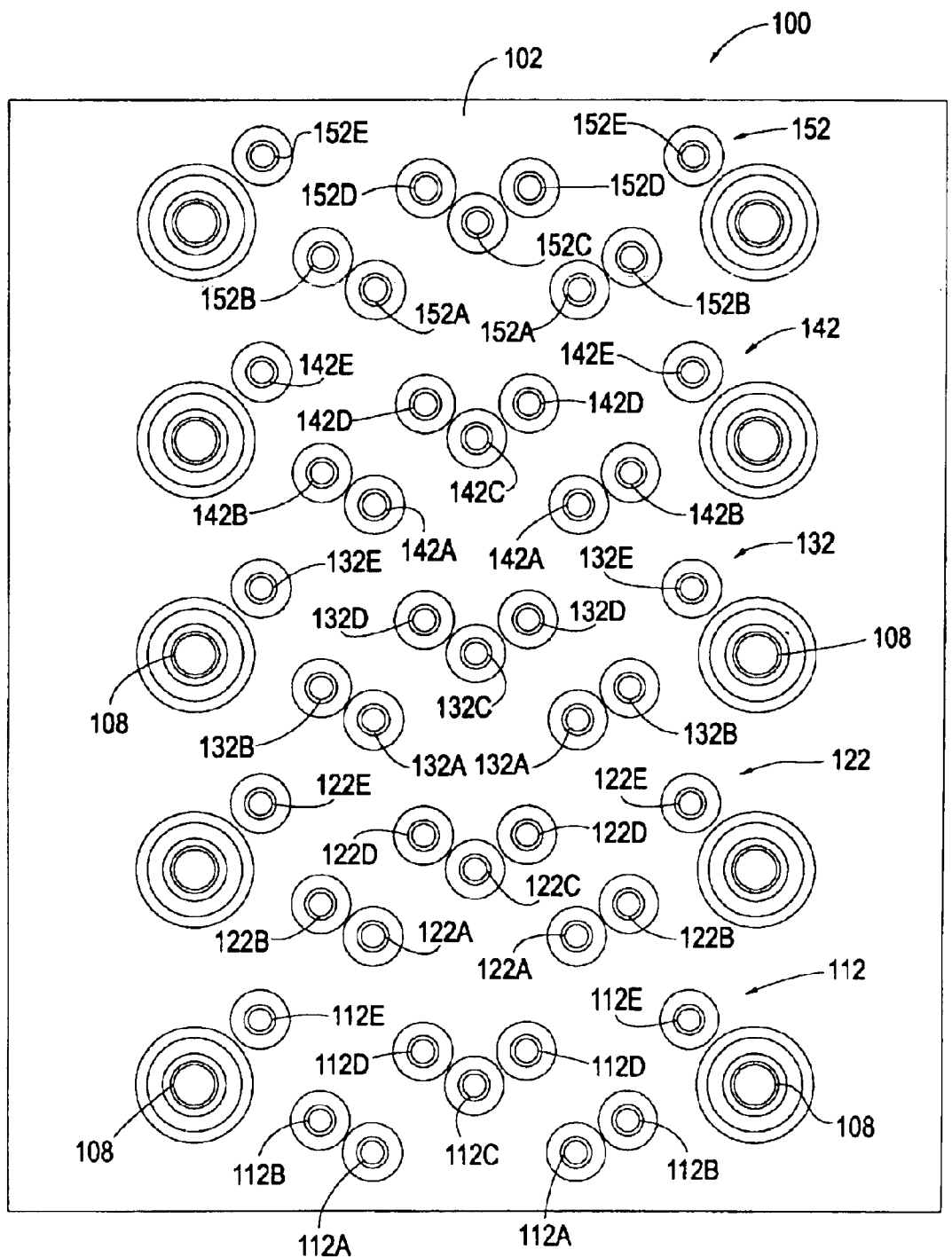
FIG. 6 is a top plan view of a manifold forming a part of the burner assembly of FIG. 1.

As shown in FIG. 6, five sets of supply openings 112, 122, 132, 142, 152 are formed in the top face 102 and are distributed along the length of the manifold 100. The set 112 includes supply openings 112A, 112B, 112C, 112D, 112E spaced apart along the height and distributed along the length of the manifold 100. Similarly, the sets 122, 132, 142, and 152 include supply openings 122A–122E, 132A–132E, 142A–142E, and 152A–152E, respectively, which are arranged in the same manner as the supply openings 112A–112E. The supply openings are preferably spaced apart from between about 5 mm and 19 mm from the adjacent supply openings of the same set. High temperature elastomer O-rings, such as made from Viton, may be provided about each supply opening.

As shown in FIGS. 16–25, five sets of passages 114A–E, 124A–E, 134A–E, 144A–E, 154A–E are formed in the manifold 100 and extend laterally and vertically through the manifold 100 to fluidly connect the sets of inlet openings 110, 120, 130, 140, and 150 to the sets of supply openings 112, 122, 132, 142, and 152, respectively. More particularly, each set of passages includes five passages, each joining one of the inlet openings with a respective one of the supply openings. For example, one set includes passages 114A, 114B, 114C, 114D, and 114E connecting the openings 110A and 112A, the openings 110B and 112B, the openings 110C and 112C, the openings 110D and 112D, and the openings 110E and 112E, respectively. Similarly, the remaining four sets of passages each include five passages 124A–124E, 134A–134E, 144A–144E, and 154A–154E, respectively. In similar fashion to the passages 114A–114E, the passages 124A–124E connect each of the inlet openings 120A–120E to the corresponding supply openings 122A–122E, the passages 134A–134E connect each of the inlet openings 130A–130E to the corresponding supply openings 132A–132E, the passages 144A–144E connect each of the inlet openings 140A–140E to the corresponding supply openings 142A–142E, and the passages 154A–154E connect each of the inlet openings 150A–150E to the corresponding supply openings 152A–152E.

As best illustrated in FIGS. 1 and 2, the modules 50 may be substantially identically formed. Accordingly, only one of the modules 50 will be described in detail hereinbelow. As noted above, each module 50 includes an adapter 200 and a burner 300.

Figure 4:
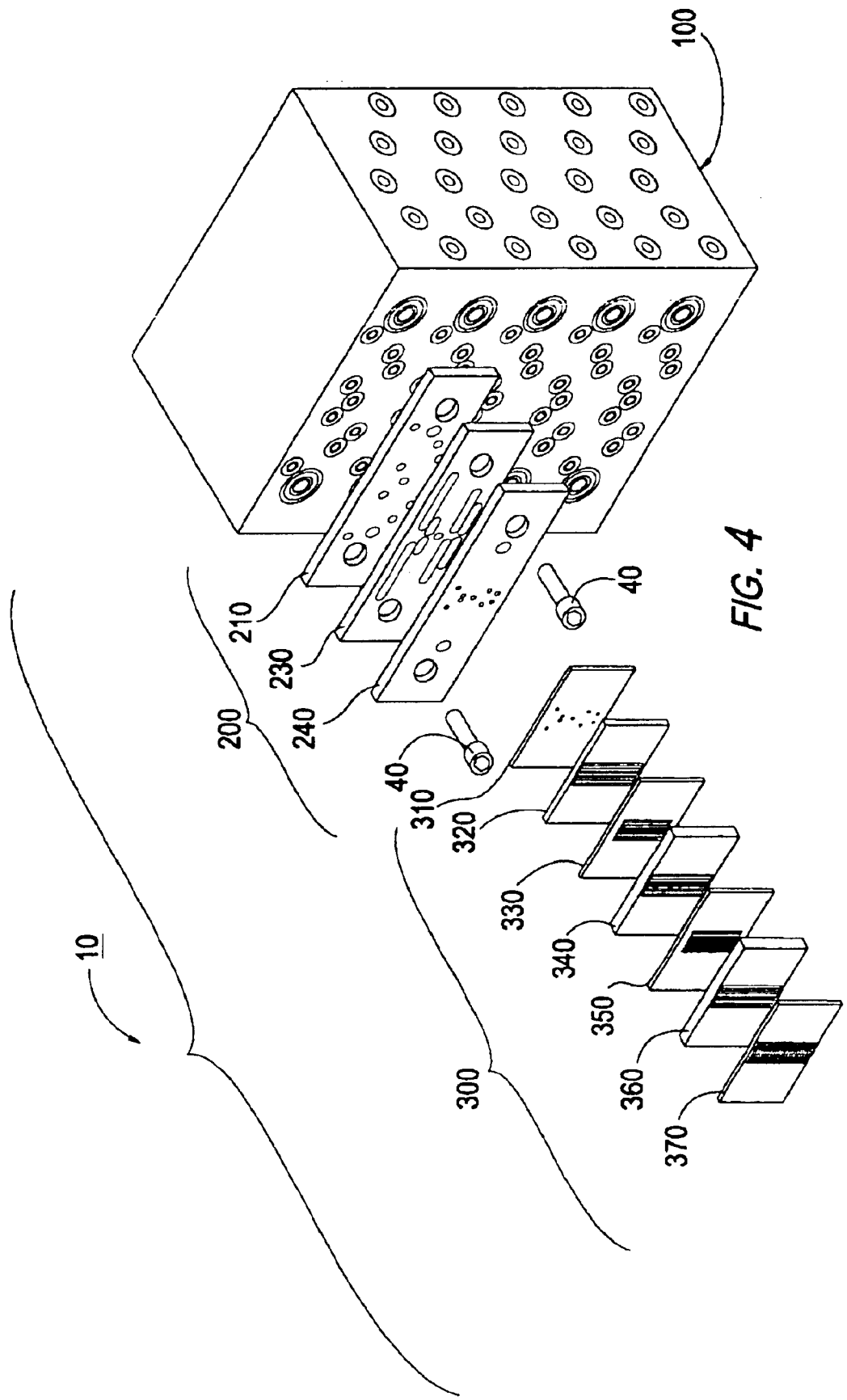
FIG. 4 is an exploded, perspective view of the burner assembly of FIG. 1.
Figure 7:
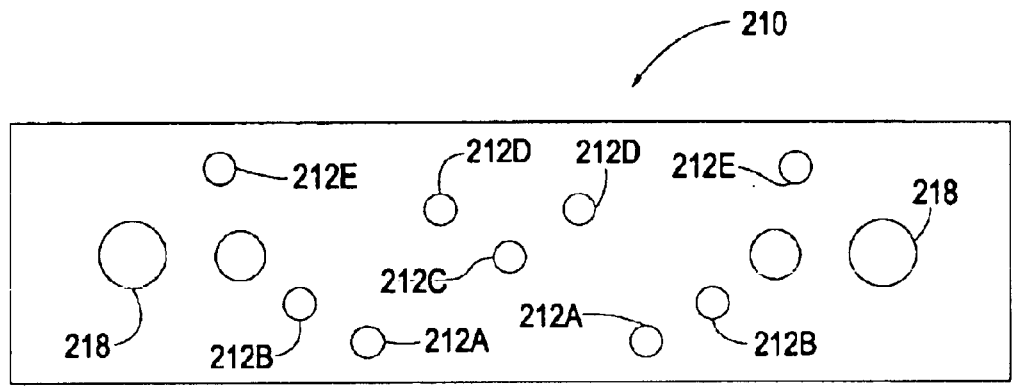
FIG. 7 is a top plan view of a manifold interface adapter layer forming a part of the burner assembly of FIG. 1.
Figure 8:
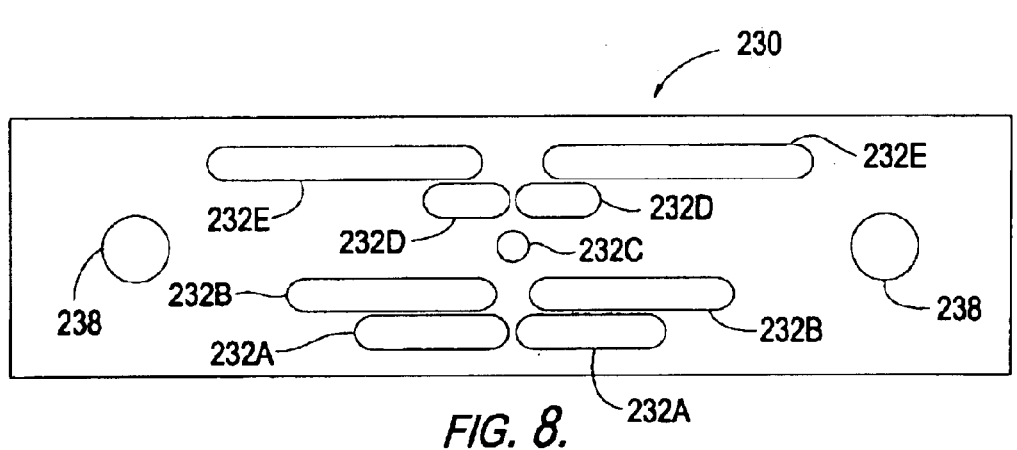
FIG. 8 is a top plan view of a convergence adapter layer forming a part of the burner assembly of FIG. 1.
Figure 9:
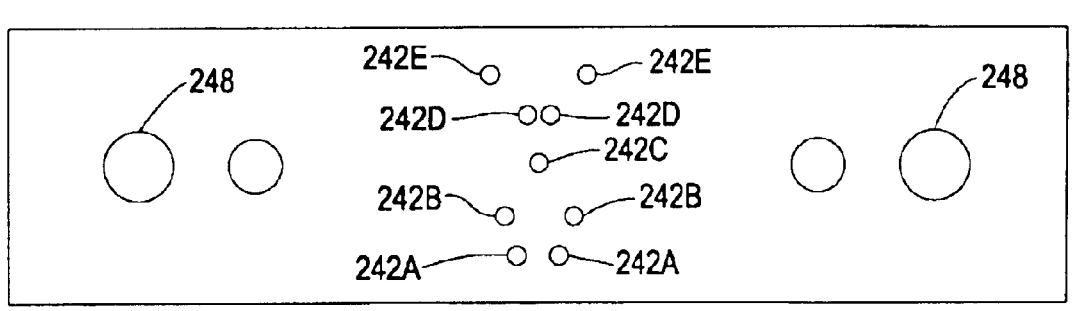
FIG. 9 is a top plan view of a burner interface layer forming a part of the burner assembly of FIG. 1.

With reference to FIGS. 4 and 7–9, the mounting adapter 200 includes a manifold interface adapter layer 210 (FIGS. 4 and 7), a convergence adapter layer 230 (FIGS. 4 and 8), and a burner interface layer 240 (FIGS. 4 and 9). The layers 210, 230, 240 are stacked as illustrated. In the manufacturing process, the layers 210, 230, 240 are preferably fused or anodically bonded to one another.

With reference to FIG. 7, the adapter layer 210 includes apertures 212A, 212B, 212C, 212D, 212E and 218 extending fully through its thickness. The layer 210 is preferably between about 2 mm and 4 mm thick. The layer 210 is mounted on the top face 102 of the manifold 100 such that the apertures 212A, 212B, 212C, 212D, 212E align with the supply openings 112A, 112B, 112C, 112D, 112E (FIG. 6), respectively, to provide fluid communication therethrough. The openings 218 align with the bores 108 and are adapted to receive the bolts 40 therethrough. Preferably, the layer 210 is formed of glass, silicon, silicon carbide, borosilicate glass, polycrystalline silica, ceramic, plastic, or photodefinable metal. More preferably, the layer 210 is formed of PYREX® material manufactured by Corning Incorporated of Corning, N.Y.

With reference to FIG. 8, the adapter layer 230 of mounting adapter 200 (FIGS. 1, 2) includes laterally extending slots 232A, 232B, 232D, 232E, an aperture 232C and apertures 238 extending fully through its thickness. The layer 230 preferably has a thickness of between about 2 mm and 4 mm. The slots 232A, 232B, 232D, 232E each extend transversely (i.e., along the direction parallel to the lateral axis B—B) along the length of the adapter layer 230. The layer 230 is mounted on the layer 210 such that the apertures 212A align and connect with the slots 232A adjacent the outer ends thereof (see FIG. 16), the apertures 212B align and connect with the slots 232B adjacent the outer ends thereof (see FIG. 18), the aperture 212C aligns and connects with the aperture 232C (see FIG. 20), the apertures 212D align and connect with the apertures 232D adjacent the outer ends thereof (see FIG. 22), and the apertures 212E align and connect with the apertures 232E adjacent the outer ends thereof (see FIG. 24). Preferably, the slots 232A each have a length of between about 14 mm and 15 mm, the slots 232B each have a length of between about 20 mm and 21 mm, the slots 232D each have a length of between about 8 mm and 9 mm, and the slots 232E each have a length of between about 27 mm and 28 mm. Preferably, the layer 230 is formed of glass, silicon, silicon carbide, borosilicate glass, polycrystalline silica, ceramic, plastic, or photodefinable metal. More preferably, the layer 230 is formed of silicon.

With reference to FIG. 9, the adapter layer 240 includes apertures 242A, 242B, 242C, 242D, 242E and 248 extending fully through its thickness. Preferably, the layer 240 has a thickness of between about 2 mm and 4 mm. The layer 240 is mounted on the layer 230 such that the apertures 242A mate with the slots 232A adjacent the inner ends thereof (see FIG. 16), the apertures 242B mate with the slots 232B adjacent the inner ends thereof (see FIG. 18), the aperture 242C (see FIG. 20) mates with the aperture 232C, the apertures 242D mate with the slots 232D adjacent the inner ends thereof (see FIG. 22), and the apertures 242E mate with the slots 232E adjacent the inner ends thereof (see FIG. 24). The diameters and shapes of the apertures 242A–242E are substantially the same as the diameters and shapes of the apertures 312A–312E discussed below. The apertures 242A–242E may be smaller than and/or differently shaped than the apertures 212A–212E. Preferably, the layer 240 is formed of glass, silicon, silicon carbide, borosilicate glass, polycrystalline silica, ceramic, plastic, or photodefinable metal. More preferably, the layer 240 is formed of PYREX®.

Turning to the burner 300 in more detail as shown in FIG. 4, the burner 300 includes an adapter interface layer 310, a plenum layer 320, a distribution layer 330, a plenum layer 340, a distribution layer 350, a plenum layer 360, and a burner face layer 370. The layers 310, 320, 330, 340, 350, 360, 370 are stacked similarly as is illustrated for the adapter 200. The layers 310, 320, 330, 340, 350, 360, 370 are preferably fused or anodically bonded to one another and to the adapter layer 240.

Figure 10:
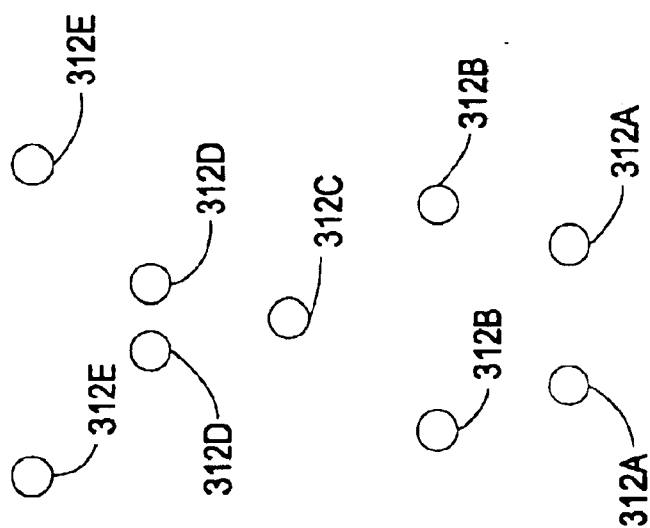
FIG. 10 is a top plan view of an adapter interface layer forming a part of the burner assembly of FIG. 1.

With reference to FIG. 10, the interface layer 310 includes apertures 312A, 312B, 312C, 312D, 312E extending fully through the thickness thereof. Preferably, the layer 310 has a thickness of between about 400 microns and 500 microns. The layer 310 is mounted on the adapter layer 240 such that the apertures 312A, 312B, 312C, 312D, 312E align and seal with the apertures 240A, 240B, 240C, 240D, 240E, respectively, to provide a passage and fluid communication therethrough. Preferably, the layer 310 is formed of glass, silicon, silicon carbide, borosilicate glass, polycrystalline silica, ceramic, plastic, or photodefinable metal. More preferably, the layer 310 is formed of silicon.

Figure 11:
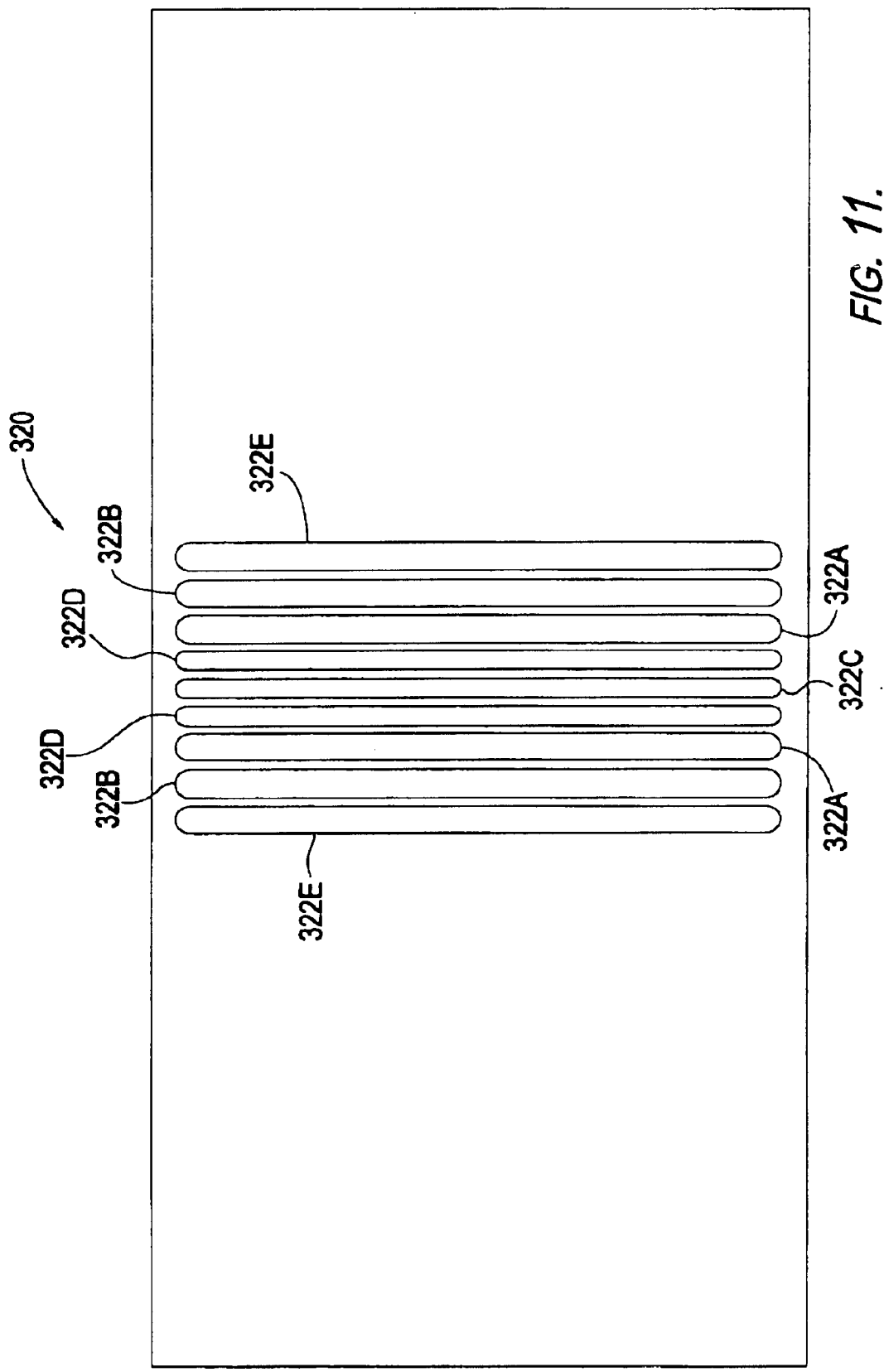
FIG. 11 is a top plan view of a plenum layer forming a part of the burner assembly of FIG. 1.

With reference to FIG. 11, the plenum layer 320 includes longitudinally extending slots 322A, 322B, 322C, 322D, 322E extending fully through the thickness thereof. Preferably, the thickness of the layer 320 is between about 1 and 5 mm, and more preferably, between about 2 and 4 mm. The layer 320 is mounted to the layer 310 such that the slots 322A, 322B, 322C, 322D, 322E mate and align with the apertures 312A, 312B, 312C, 312D, 312E, respectively. Preferably, each of the apertures 312A, 312B, 312C, 312D, 312E enters the respective slot at locations along each slot 322A, 322B, 322C, 322D, 322E. Preferably, each slot 322A–322E has a width (i.e., extending parallel to the lateral axis B—B) of between about 650 and 1000 microns. The lateral distance between adjacent ones of the slots 322A–322E is preferably between about 100 and 1000 microns, and more preferably, between about 350 and 500 microns. Preferably, the layer 320 is formed of glass, silicon, silicon carbide, borosilicate glass, polycrystalline silica, ceramic, plastic, or photodefinable metal. More preferably, the layer 320 is formed of PYREX®.

Figure 12:
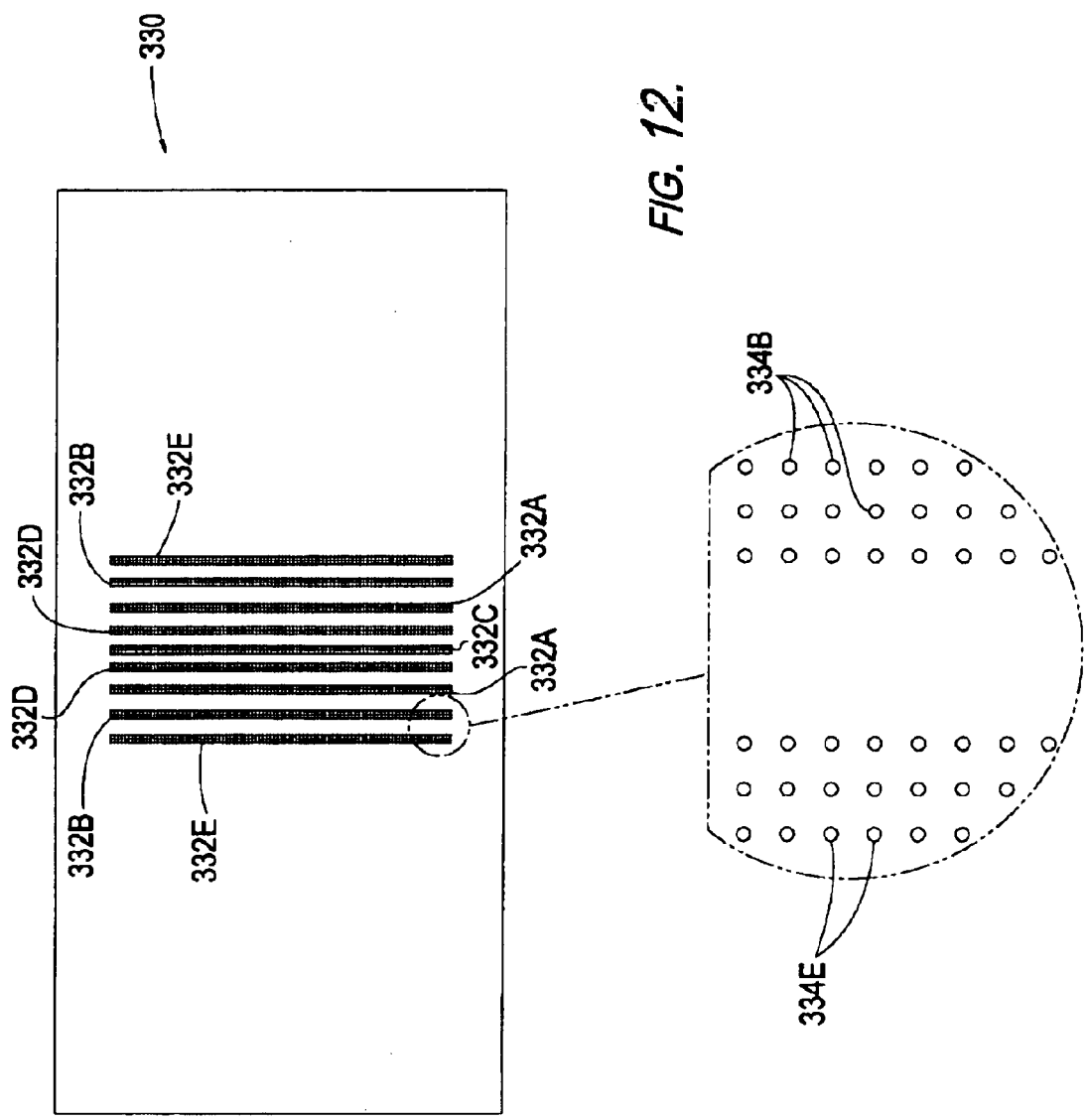
FIG. 12 is a top plan view of a distribution layer forming a part of the burner assembly of FIG. 1 with enlarged details.

With reference to FIG. 12, a first distribution layer 330 includes sets of apertures 332A, 332B, 332C, 332D, 332E. Each set of apertures 332A, 332B, 332C, 332D, 332E includes a plurality of apertures defining a selected pattern. Each set 332A, 332B, 332C, 332D, 332E in this embodiment is preferably substantially identical and includes a uniform array of apertures. The apertures 334E (forming a part of the set 332E) and the apertures 334B (forming a part of the set 332B) as shown in the enlargement of FIG. 12 are exemplary. Preferably, the apertures of the sets (including the apertures 334B and 334E) are circular and each have a diameter of between about 5 and 300 microns, and more preferably, between about 50 and 200 microns. Preferably, adjacent ones of the apertures are spaced apart from one another a distance of between about 75 microns and 80 microns. Preferably, the thickness of the distribution layer 330 is between about 300 and 700 microns, and more preferably, between about 400 and 550 microns. Preferably, the layer 330 is formed of glass, silicon, silicon carbide, borosilicate glass, polycrystalline silica, ceramic, plastic, or photodefinable metal. More preferably, the layer 330 is formed of silicon.

Figure 13:
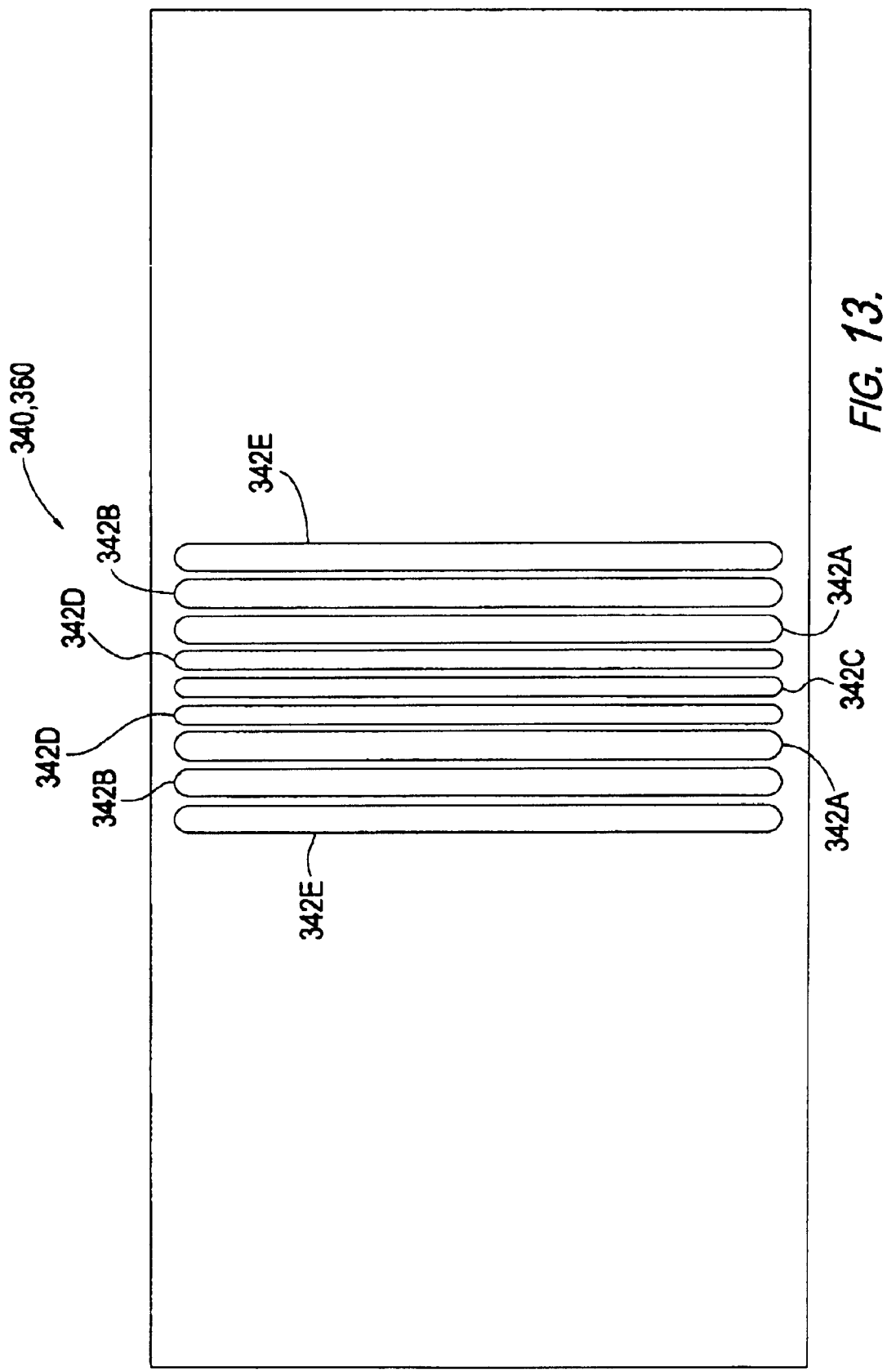
FIG. 13 is a top plan view of a further plenum layer forming a part of the burner assembly of FIG. 1.

With reference to FIG. 13, the plenum layer 340 includes longitudinally extending slots 342A, 342B, 342C, 342D, 342E extending through the thickness thereof. Preferably, the layer 340 has a thickness of between about 1 and 5 mm, and more preferably, between about 2 and 4 mm. The layer 340 is mounted on the layer 330 such that the slots 342A, 342B, 342C, 342D, 342E mate and align with the sets of apertures 332A, 332B, 332C, 332D, 332E, respectively. Preferably, all the sets of apertures 332A, 332B, 332C, 332D, 332E, empty into the slots 342A, 342B, 342C, 342D, 342E in operation. Preferably, each slot 342A–342E has a width of between about 650 and 1000 microns. The lateral distance between adjacent ones of the slots 342A–342E is preferably between about 100 and 1000 microns, and more preferably, between about 350 and 500 microns. Preferably, the layer 340 is formed of glass, silicon, silicon carbide, borosilicate glass, polycrystalline silica, ceramic, plastic, or photodefinable metal. More preferably, the layer 340 is formed of PYREX®.

Figure 14:
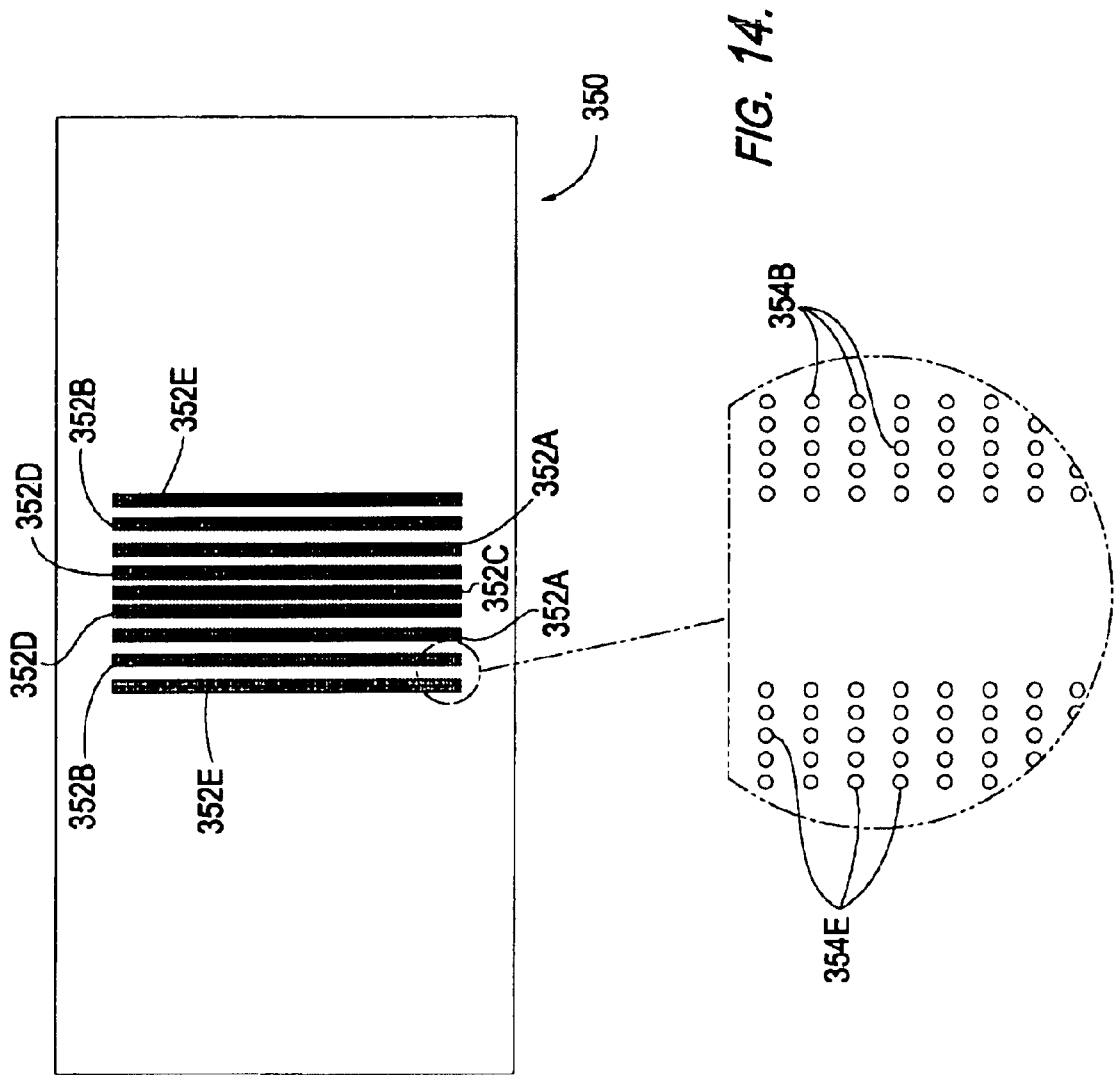
FIG. 14 is a top plan view of a further distribution layer forming a part of the burner assembly of FIG. 1 with enlarged details.

With reference to FIG. 14, a second distribution layer 350 includes sets of apertures 352A, 352B, 352C, 352D, 352E. Each set of apertures 352A, 352B, 352C, 352D, 352E includes a plurality of apertures defining a selected pattern. In this embodiment, each set 352A, 352B, 352C, 352D, 352E is preferably substantially identical and includes a uniform array of apertures. The apertures 354E (forming parts of the set 352E) and the apertures 354B (forming parts of the set 352B) as shown in the enlargements of FIG. 14 are exemplary. Preferably, the apertures of the sets 352A, 352B, 352C, 352D, 352E (including the apertures 354B and 354E) are preferably circular and each have a diameter of between about 5 and 300 microns, and more preferably, between about 50 and 200 microns. Preferably, the average diameter of the apertures of the distribution layer 350 is less than the average diameter of the apertures of the distribution layer 330. Preferably, adjacent ones of the apertures of the sets 352A–352E are spaced apart from one another a distance of between about 70 and 80 microns. Preferably, the thickness of the layer 350 is between about 300 and 700 microns, and more preferably, between about 400 and 550 microns. Preferably, the layer 350 is formed of glass, silicon, silicon carbide, borosilicate glass, polycrystalline silica, ceramic, plastic, or photodefinable metal. More preferably, the layer 350 is formed of silicon.

With reference to FIG. 13, the plenum layer 360 is substantially identical to the layer 340. The longitudinally extending slots of the layer 360 correspond to the longitudinally extending slots 342A, 342B, 342C, 342D, 342E and overlie the sets of apertures 352A, 352B, 352C, 352D, 352E, respectively, of the layer 350.

Figure 15:
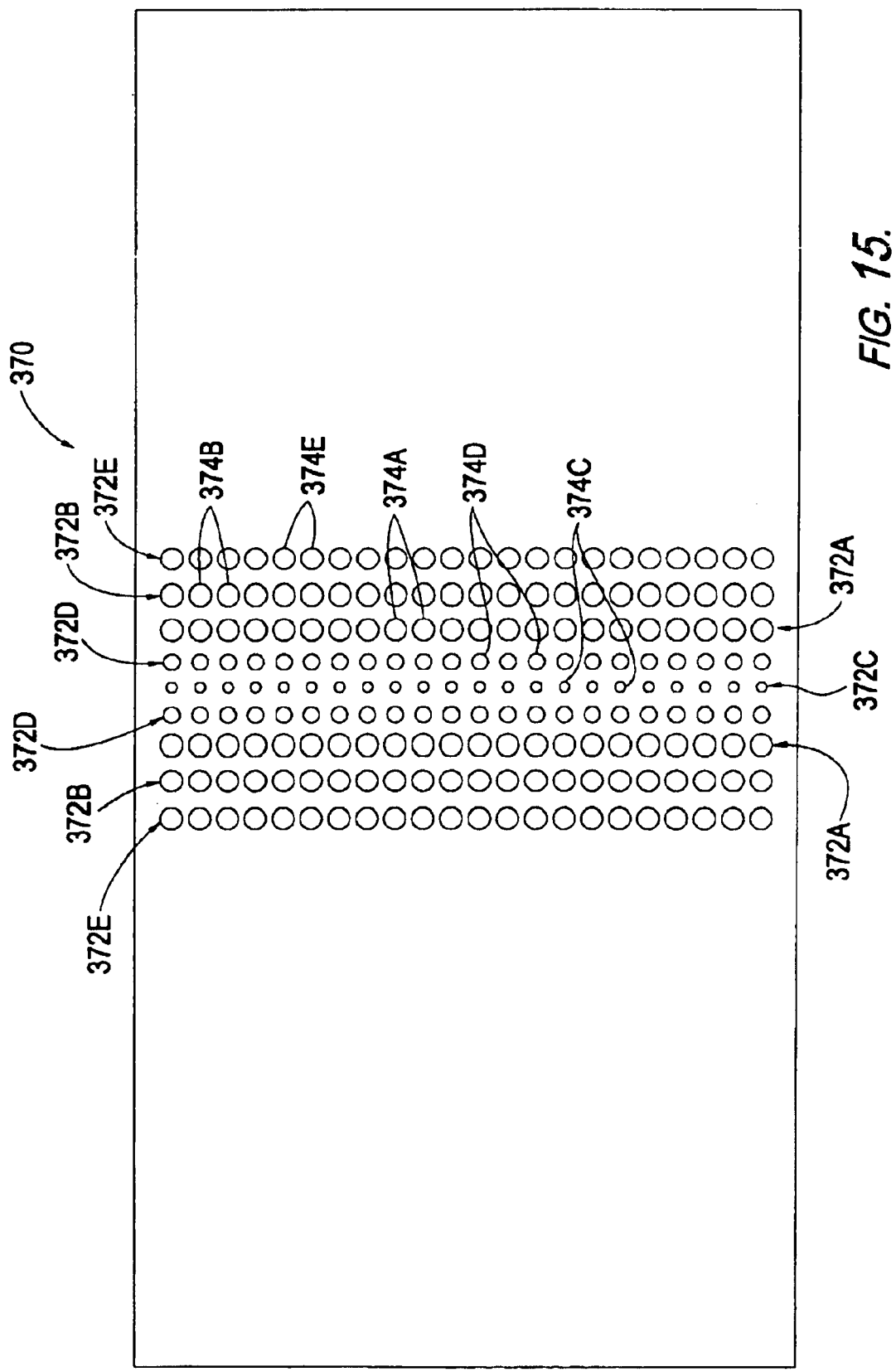
FIG. 15 is a top plan view of a burner face layer forming a part of the burner assembly of FIG. 1.
Figure 16:
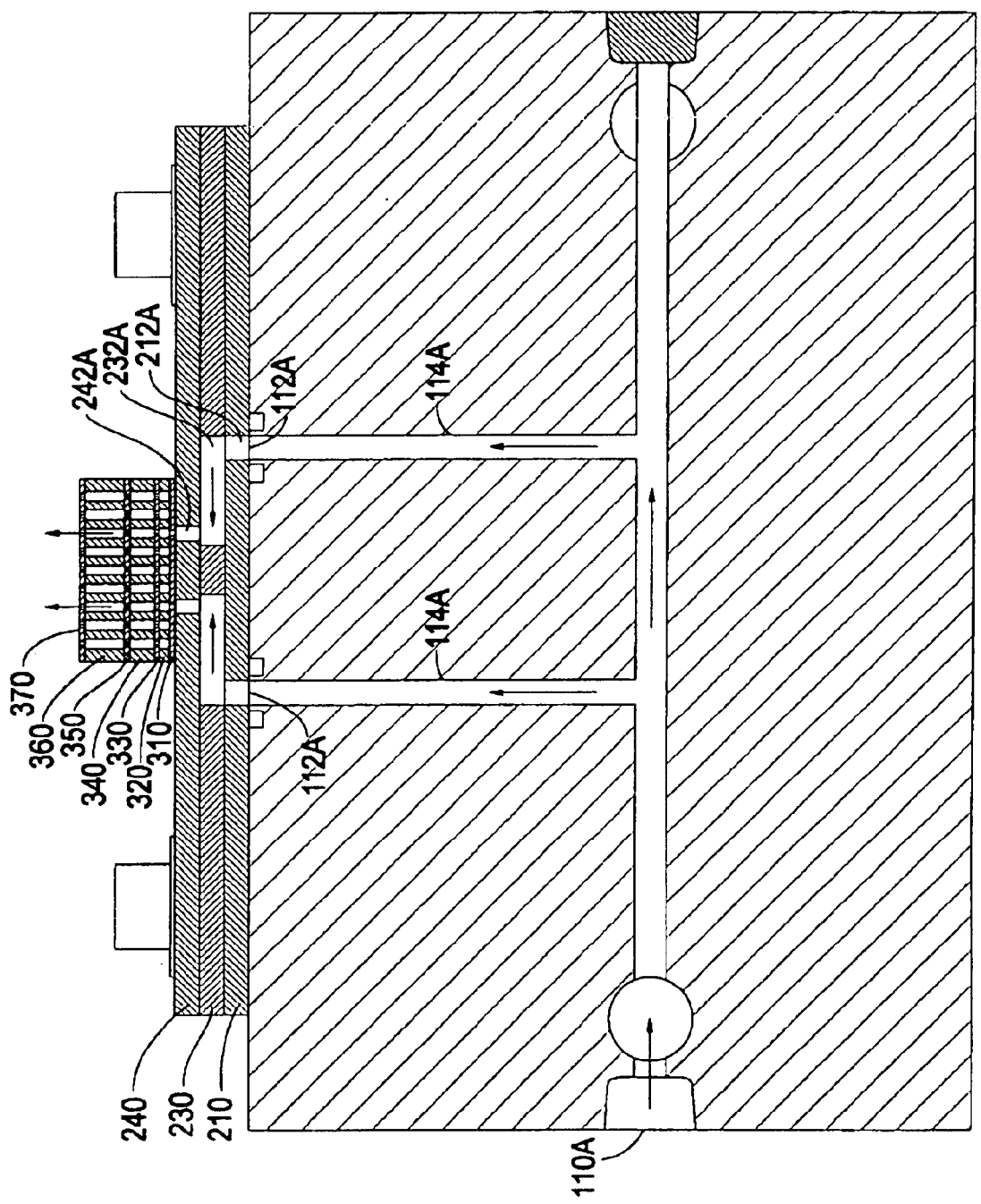
FIG. 16 is a cross-sectional view of the burner assembly of FIG. 1 taken along the line 16—16 of FIG. 3.
Figure 17:
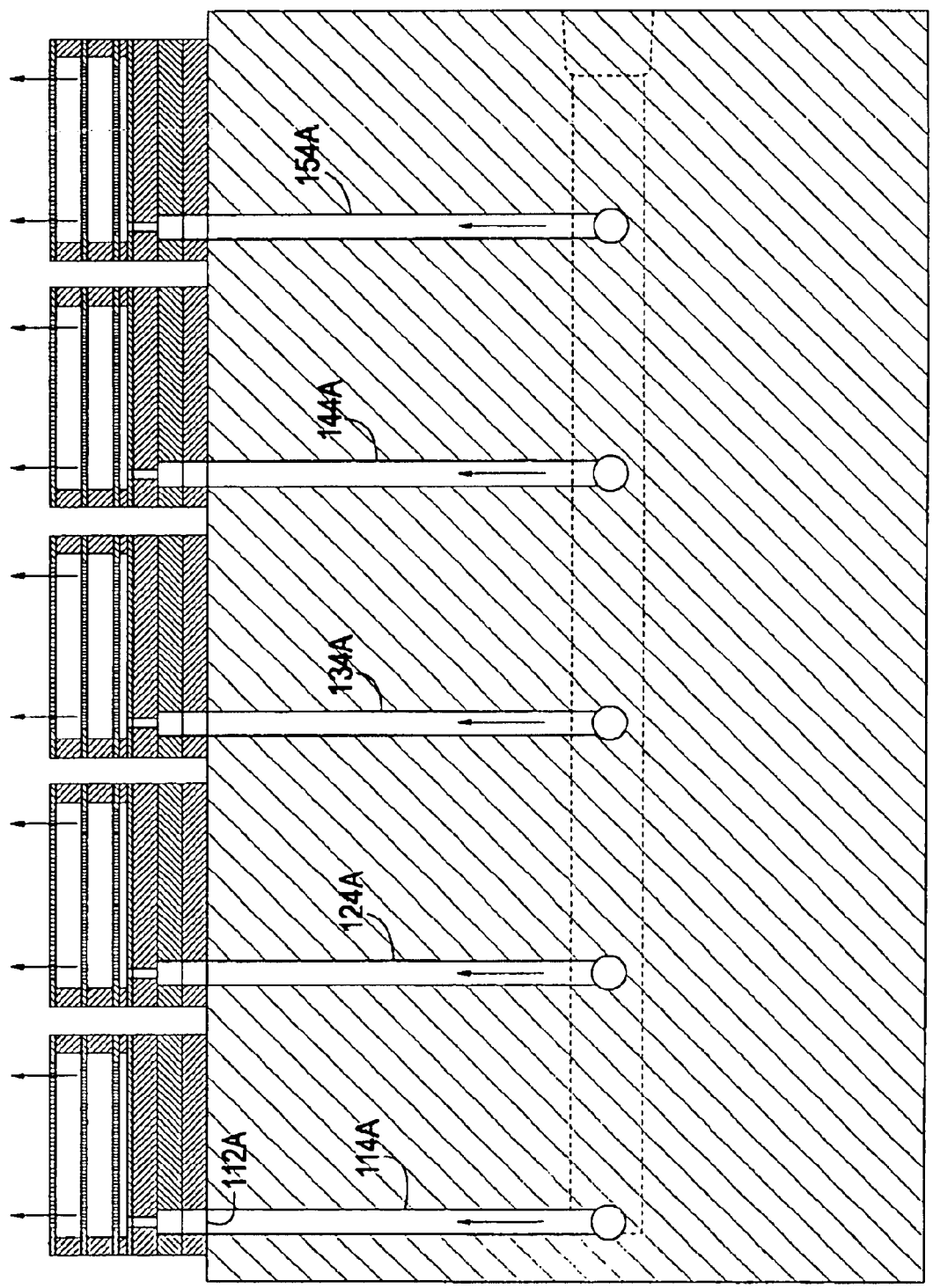
FIG. 17 is a cross-sectional view of the burner assembly of FIG. 1 taken along the line 17—17 of FIG. 5.
Figure 18:
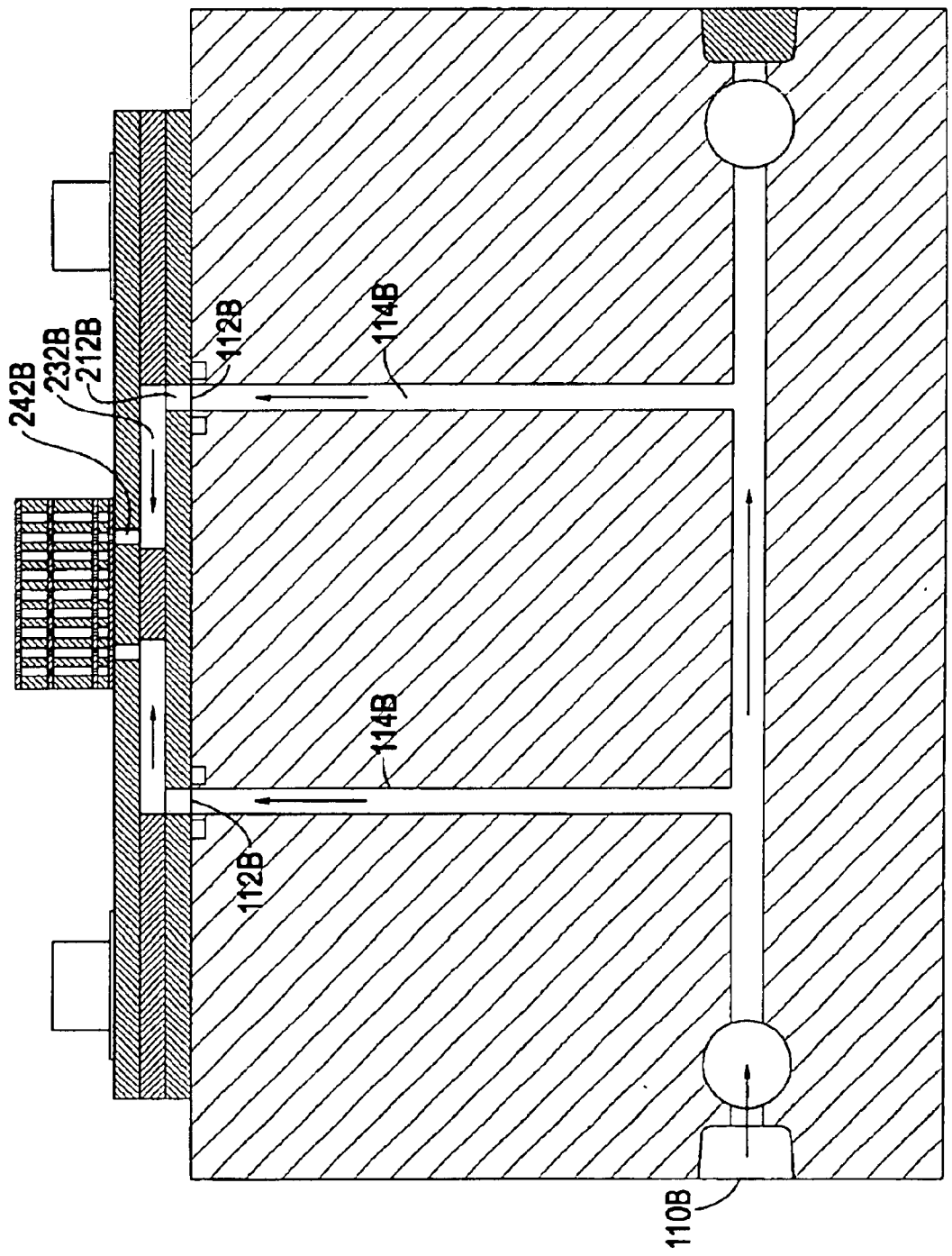
FIG. 18 is a cross-sectional view of the burner assembly of FIG. 1 taken along the line 18—18 of FIG. 3.
Figure 19:
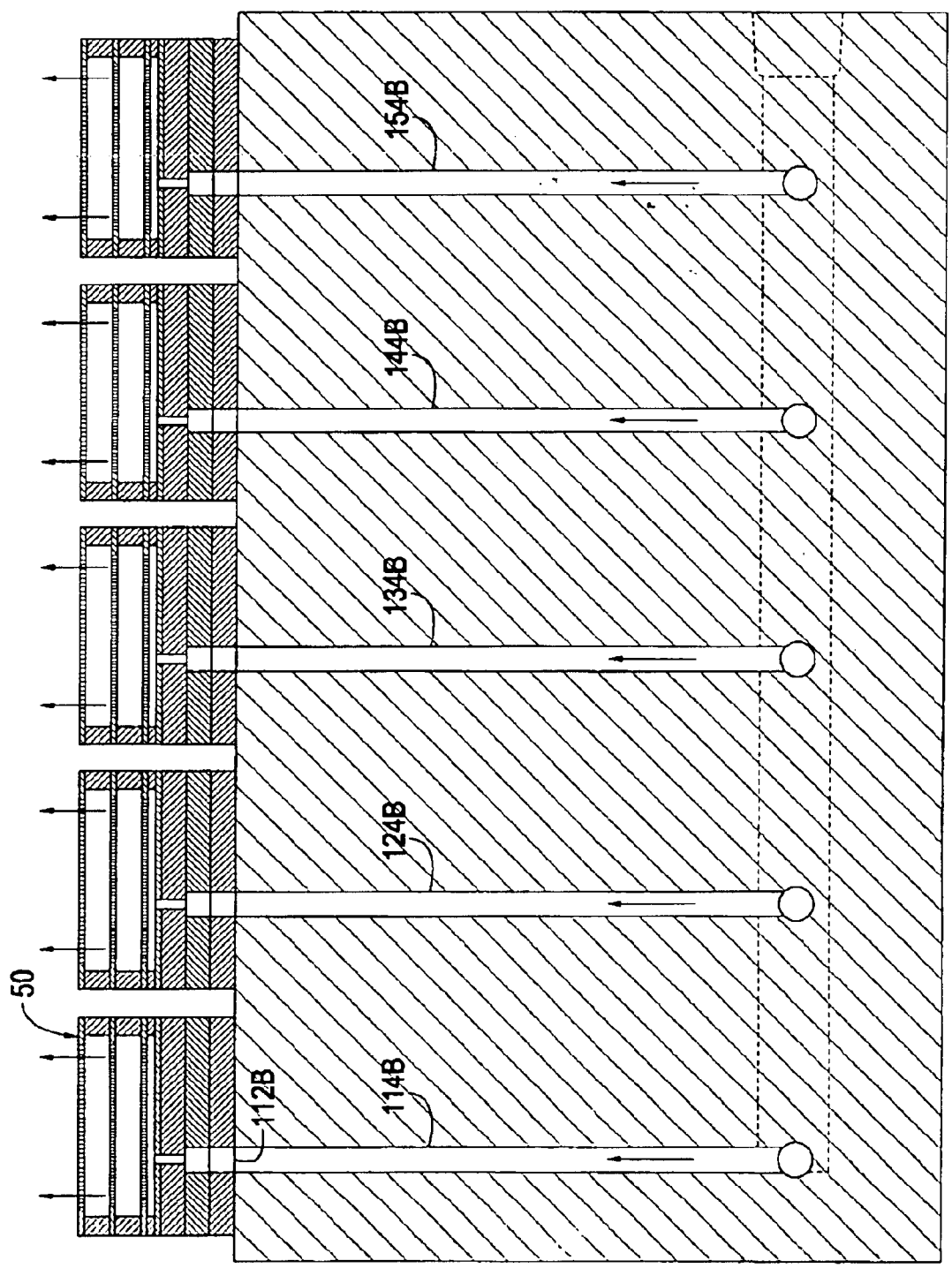
FIG. 19 is a cross-sectional view of the burner assembly of FIG. 1 taken along the line 19—19 of FIG. 5.
Figure 20:
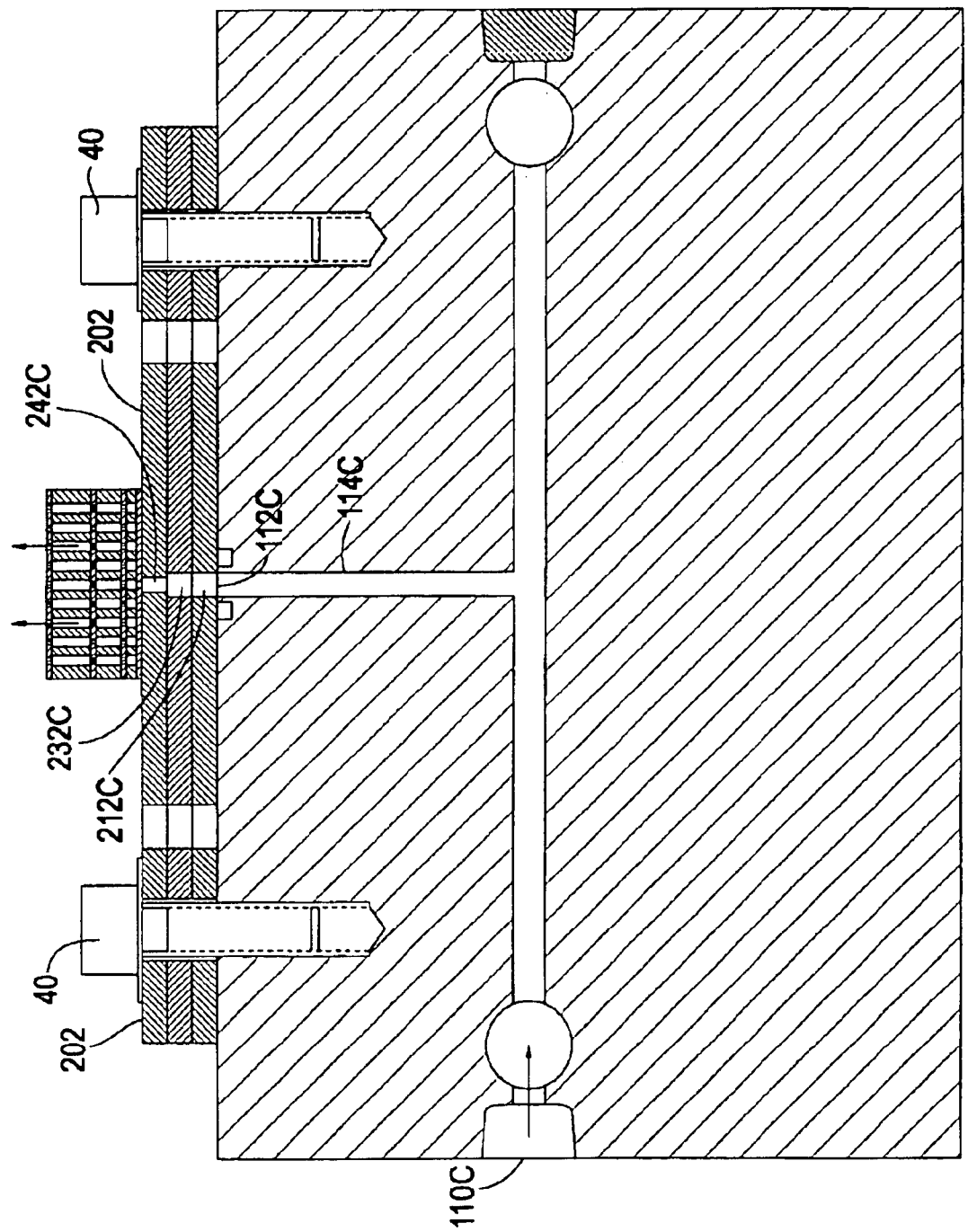
FIG. 20 is a cross-sectional view of the burner assembly of FIG. 1 taken along the line 20—20 of FIG. 3.
Figure 21:
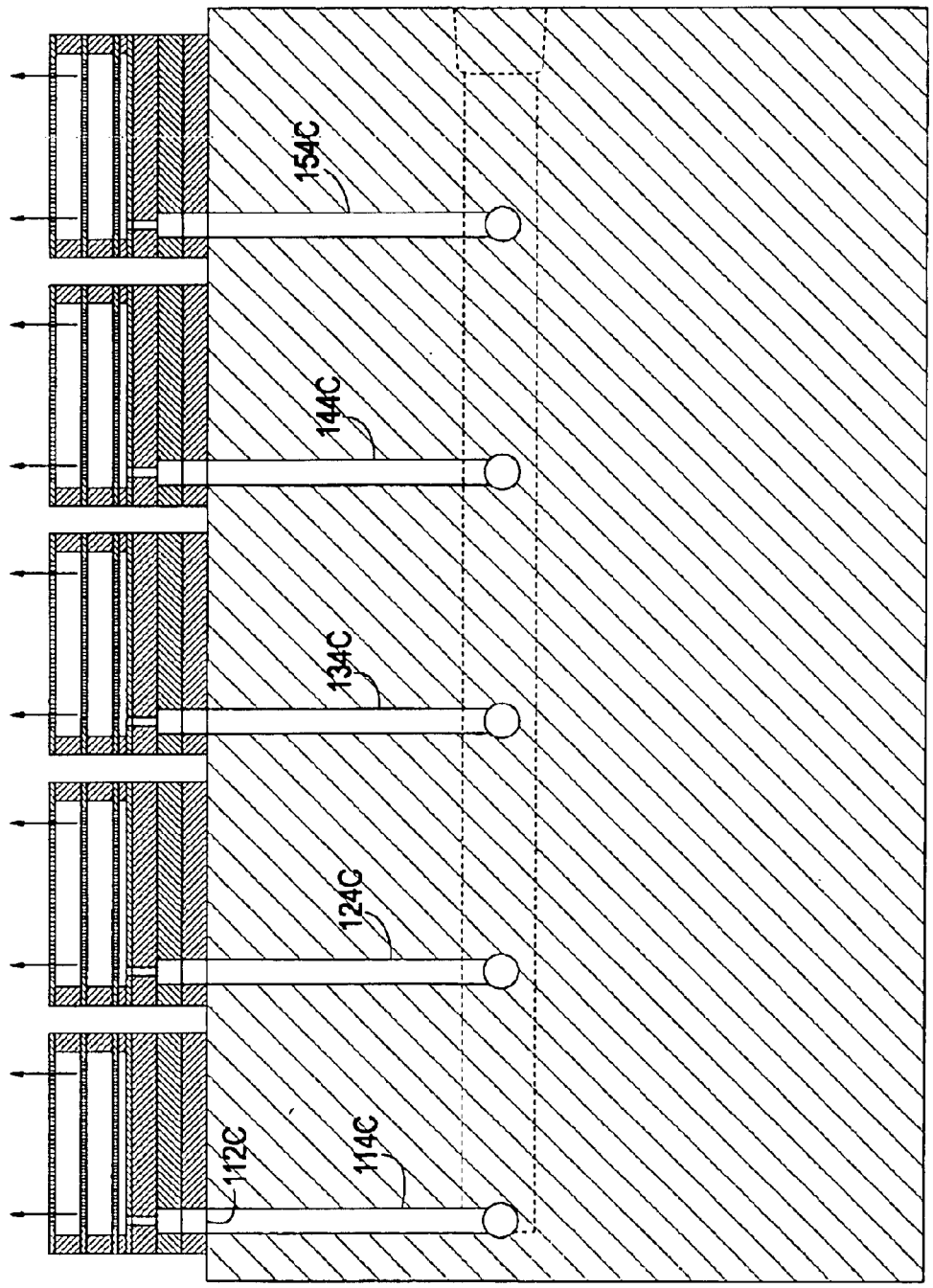
FIG. 21 is a cross-sectional view of the burner assembly of FIG. 1 taken along the line 21—21 of FIG. 5.
Figure 22:
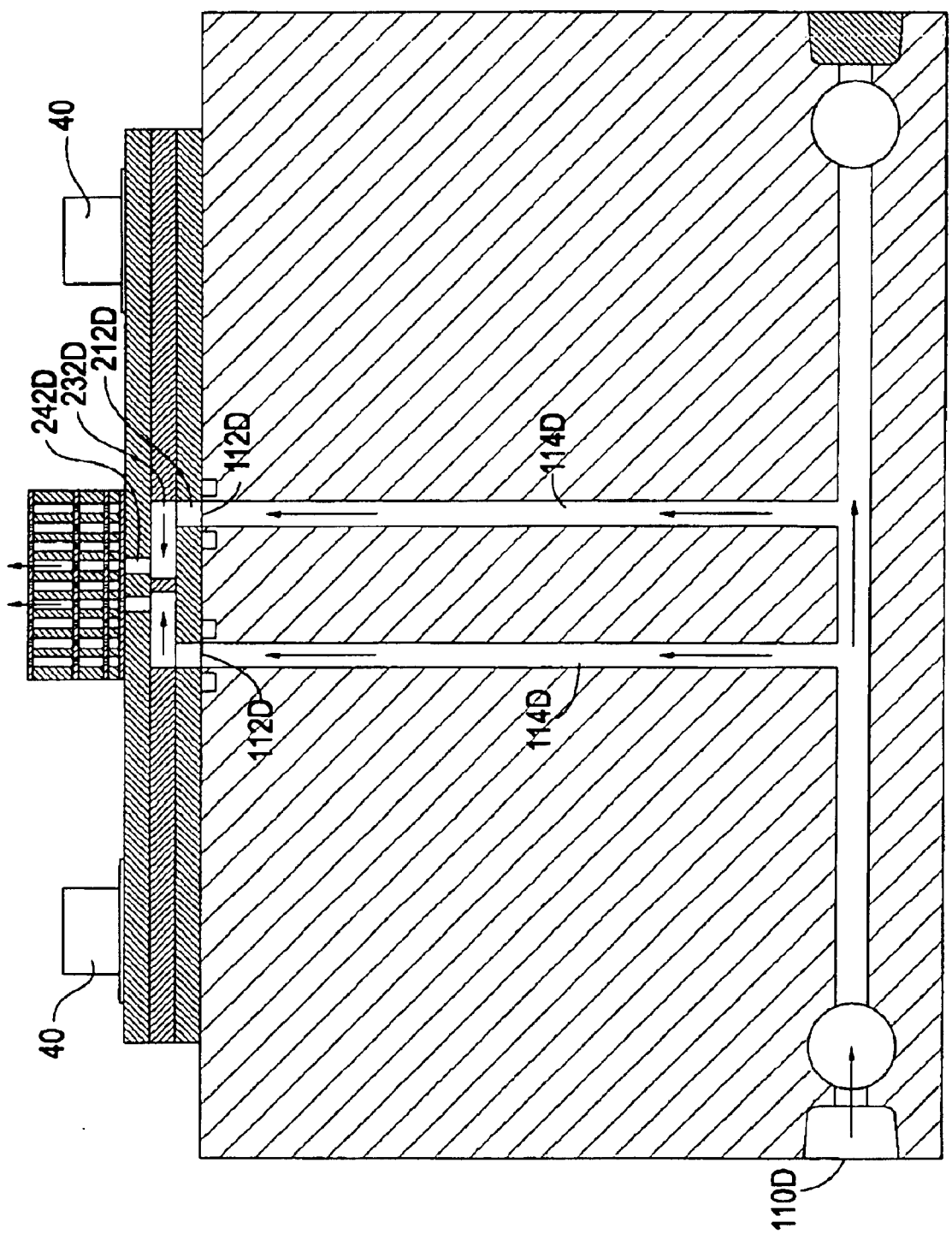
FIG. 22 is a cross-sectional view of the burner assembly of FIG. 1 taken along the line 22—22 of FIG. 3.
Figure 23:
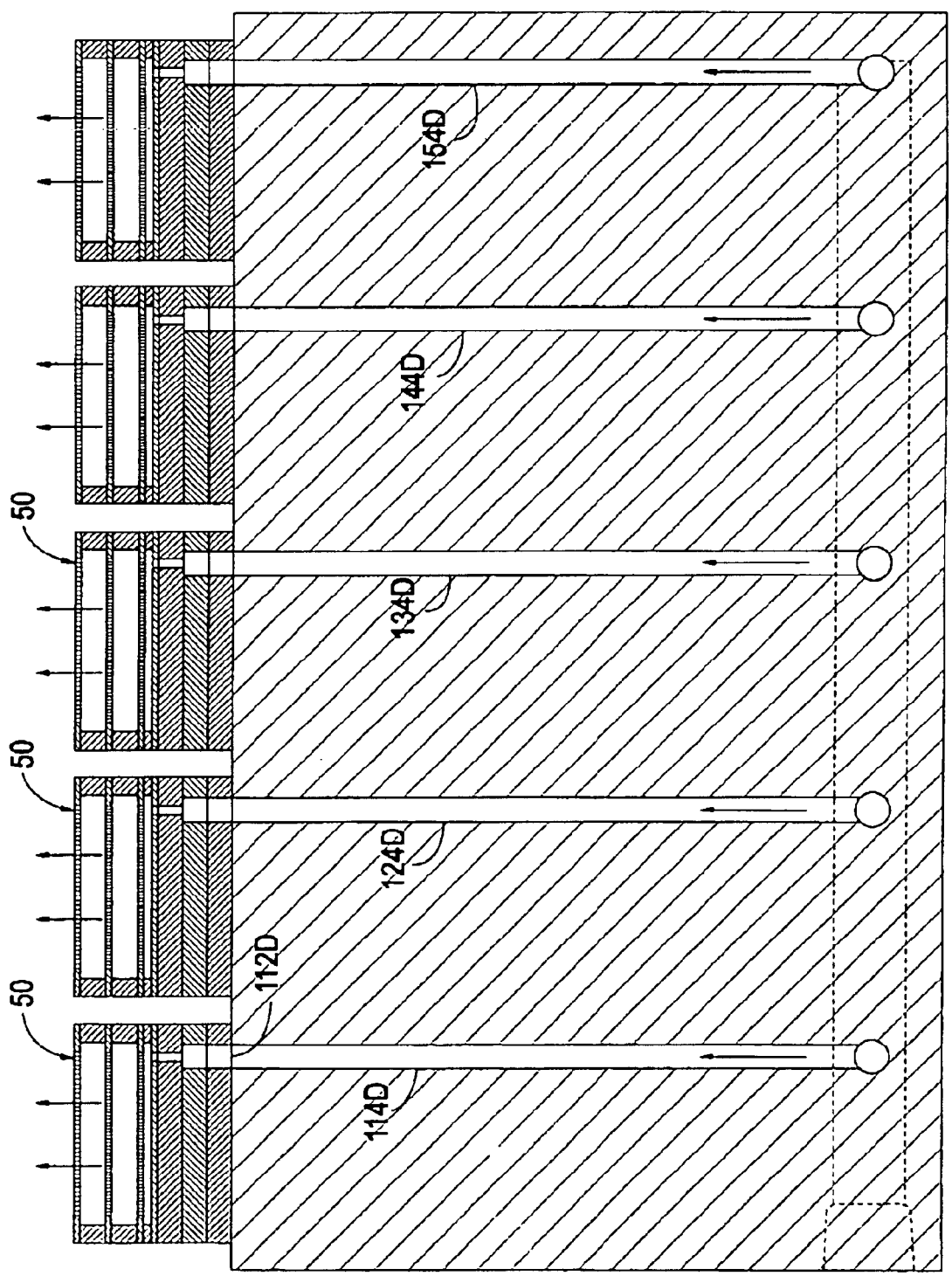
FIG. 23 is a cross-sectional view of the burner assembly of FIG. 1 taken along the line 23—23 of FIG. 5.
Figure 24:
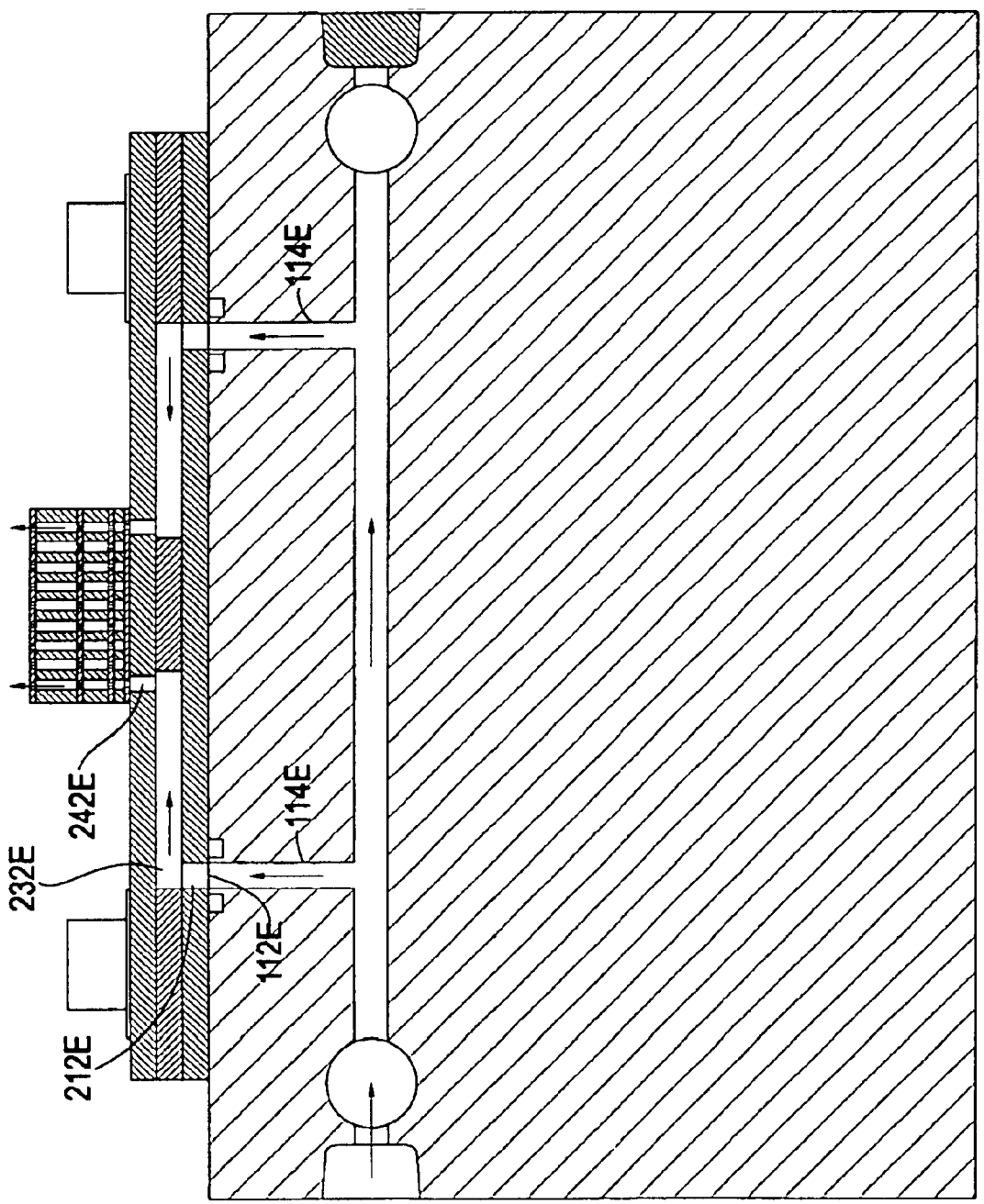
FIG. 24 is a cross-sectional view of the burner assembly of FIG. 1 taken along the line 24—24 of FIG. 3.
Figure 25:
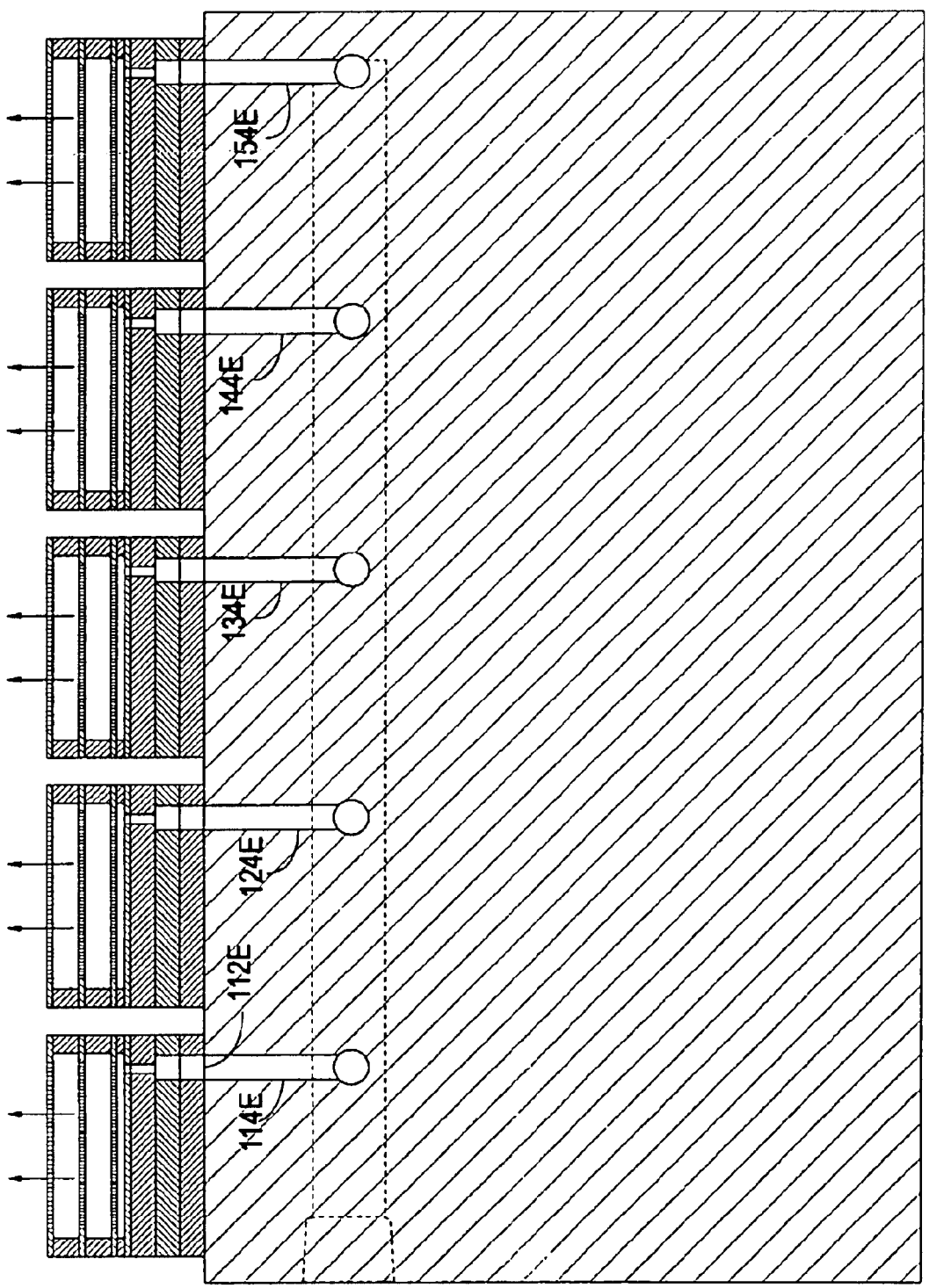
FIG. 25 is a cross-sectional view of the burner assembly of FIG. 1 taken along the line 25—25 of FIG. 5.

With reference to FIG. 15, the burner face layer 370 includes rows 372A, 372B, 372C, 372D, 372E of apertures. More particularly, each of the rows 372A includes a plurality of apertures 374A, each of the rows 372B includes a plurality of apertures 374B, the row 372C includes a plurality of apertures 372C, each of the rows 372D includes a plurality of apertures 374D, and each of the rows 372E includes a plurality of apertures 374E. The apertures 374A, 374B, 374C, 374D, 374E are preferably circular as illustrated. Preferably, the diameters of the apertures 374A, 374B, 374C, 374D, 374E are in the range of between about 100 and 2000 microns, and more preferably, between about 300 and 1000 microns. The diameters may be different in different rows as is illustrated. According to some embodiments, the diameters of the apertures 374A–374E are smaller than the diameters of apertures of the distribution layers 330, 350 along the same flow path. Preferably, adjacent ones of the apertures 374A, 374B, 374C, 374D, 374E are spaced apart from adjacent apertures in the same row by a distance of between about 164 and 342 microns. Preferably, the apertures 374A, 374B, 374C, 374D, 374E are spaced apart from apertures in adjacent rows by a distance of between about 675 and 750 microns. The burner face layer 370 is mounted on the layer 360 such that the rows 372A, 372B, 372C, 372D, 372E overlie the slots of the layer 360 corresponding to the slots 342A, 342B, 342C, 342D, 342E, respectively.

The adapter 200 includes a pair of opposed mounting portions or tabs 202 (see FIGS. 1, 4 and 20) extending laterally (i.e., transversely to the length of the manifold 100) beyond the burner 300. The tabs 202 each include portions of the layers 210, 230, 240 and include the apertures 218, 238, 248 (FIGS. 7–9). Preferably, the tabs 202 extend laterally beyond the burner 300 a distance W3 (FIG. 3) of between about 20 and 30 mm; more preferably between about 25 and 27 mm. The module 50 may be fastened to the top face 102 of the manifold by inserting the bolts 40 through the tabs 202 as illustrated in FIG. 1. In this manner, the tabs 202 provide a secure and convenient means for attaching the module 50 to the top face 102 of the manifold 100.

While the adapter 200 and the burner 300 have each been illustrated and described having a certain number of layers, additional layers may be provided. For example, the burner 300 may include additional distribution layers (i.e., formed similarly to the distribution layers 330, 350) and/or additional plenum layers (i.e., formed similarly to the plenum layers 320, 340, 360). Preferably, any additional distribution layers are alternatingly interleaved with one or more additional plenum layers.

The passages of the manifold 100 and the slots and apertures of the adapter 200 and the burner 300 provide fluid flow paths (gas or liquid) from the inlet openings (e.g., the openings 110A, 110B, 110C, 110D, 110E shown in FIG. 5) to the burner face layers 370 (FIG. 4) of the burner modules 50. Each of the flow paths is fluidly isolated from the others. The passages and flow paths associated with each of the burner modules 50 and the sets 110, 120, 130, 140, 150 are substantially identical except for their locations along the length of the manifold 100; accordingly, the passages and flow paths associated with the set 110 and the left endmost burner module 50 (as viewed in FIG. 5) are exemplary and will be described hereinafter.

With reference to FIG. 26, supplies 70A, 70B, 70C, 70D, 70E of burner fluids are fluidly connected to the inlet openings 110A, 110B, 110C, 110D, 110E, respectively. The burner fluids may include process materials such as glass precursors, combustion fuels, carriers and facilitators. The burner fluids may be supplied as gases and/or liquids. Each fluid supply may be pressurized by suitable means. For example, one or more of the fluids may be supplied from a pre-pressurized vessel regulated using a regulator and/or a mass flow controller and/or using a pump, bubbler or vaporizer. Preferably, each supply is pressurized at the respective inlet opening 110A, 110B, 110C, 110D, 110E to a pressure of between about 10 and 100 psi gage.

Burner fluid supplies may also be fluidly connected to each of the sets of inlet openings 120, 130, 140, 150 for which a corresponding module 50 is mounted on the manifold 100. For clarity, these connections are not illustrated in FIG. 26.

As discussed in more detail below, the fluid supplied to the inlet 110A will exit the burner assembly 10 from the burner face layer apertures 374A, the fluid supplied to the inlet 110B will exit through the apertures 374B, the fluid supplied to the inlet 110C will exit through the apertures 374C, the fluid supplied to the inlet 110D will exit through the apertures 374D, and the fluid supplied to the inlet 110E will exit through the apertures 374E. The burner fluids preferably include $O_2$, $N_2$, $CH_4$, $H_2$, CO, $SiCl_4$, $GeCl_4$, OMCTS, $CF_4$, $SF_6$, $SiF_4$, $POCl_3$, ER(FOD), $AlCl_3$, and/or TICS. According to some preferred embodiments, the fluid supplied to the inlet 110A is a $CH_4/O_2$ premix, the fluid supplied to the inlet 110B is $O_2$, the fluid supplied to the inlet 110C is $SiCl_4$, $GeCl_4$, and $O_2$, the fluid supplied to the inlet 110D is $O_2$, and the fluid supplied to the inlet 110E is $O_2$ or, optionally, nothing.

With reference to FIGS. 7–16 and 17, the fluid supplied to the inlet 110A flows through the passage 114A, the supply openings 112A, the apertures 212A and into the transverse slots 230A. The slots 230A direct the fluid flow inwardly (i.e., convergently) to the apertures 242A. The fluid flows through the apertures 242A, through the apertures 312A and into the longitudinal slots 322A. The slots 322A serve as plenums from which the fluid then flows into and through the respective sets of apertures 332A. The fluid exiting the apertures 332A then flows into the slots 340A (which, likewise, serve as plenums), through the respective sets of apertures 252A and into the longitudinal slots 362A (which, likewise, serve as plenums). From the slots 362A, the fluid finally flows out of the burner assembly 10 through respective ones of the rows of apertures 372A of the burner face layer 370.

In the foregoing manner, the flow of the burner fluid introduced at the inlet 110A may be supplied to the burner face layer 370 without requiring special accommodation. The transverse slots 232A allow the use of relatively widely spaced apart supply openings 112A on the top face 102 of the manifold 100 while providing relatively closely spaced burner face apertures 372A. Accordingly, the openings 112A may be formed using conventional techniques while nonetheless providing a flame of the desired, relatively narrow width.

The construction of the burner assembly 10 as well as the configurations of the burner modules 50 may allow for convenient and selective shaping of the profile of the overall soot flame 21 (see FIG. 26). The length of the soot flame 21 may be adjusted by mounting more or fewer of the modules 50 on the manifold 100. The profile of the flame 21 may also be adjusted by mounting modules 50 of different configurations on the manifold 100. For example, it may be desirable to provide modules 50 adapted to provide larger flames 20 at the outer ends of the manifold 100 to provide a more uniform flame 21 along the full length of the burner assembly 10. The bolts 40 and tabs 202 may allow for secure, convenient, non-destructive, repeatable removal and remounting of the modules 50.

Moreover, the flow of the burner fluid introduced at the inlet 110A may be supplied to the burner face layer 370 in an evenly distributed manner. The plenums provided by the longitudinal slots 322A, 340A, 360A and the patterned sets of apertures 332A, 352A, as well as the rows of apertures 372A, serve to equalize the flow of the fluid along the length of the burner module 50 so that the rate and pressure of the flow from the apertures 372A is more uniform. As a result, a more uniform flame and distribution of glass precursors may be provided.

With reference to FIGS. 1–15, 18 and 19, the pressurized fluid supplied to the inlet 110B is directed to the rows of apertures 372B and conditioned or distributed in substantially the same manner as described above with respect to the pressurized fluid supplied to the inlet 110A. More particularly, the fluid supplied to the inlet 110B will flow through the passages 114B, the openings 112B, the apertures 212B, the transverse slots 232B, the apertures 242B, the apertures 312B, the longitudinal slots 322B, the sets of apertures 332B, the longitudinal slots 342B, the sets of apertures 352B, the longitudinal slots of the layer 360 corresponding to the slots 342B, and the rows of apertures 372B.

With reference to FIGS. 7–15, 20 and 21, the pressurized fluid supplied to the inlet 110C is directed to the rows of apertures 372C and conditioned or distributed in substantially the same manner as described above with respect to the pressurized fluid supplied to the inlet 110A. More particularly, the fluid supplied to the inlet 110C will flow through the passage 114C, the opening 112C, the aperture 212C, the aperture 232C, the aperture 242C, the aperture 312C, the longitudinal slot 322C, the set of apertures 332C, the longitudinal slot 342C, the set of apertures 352C, the longitudinal slot of the layer 360 corresponding to the slot 342C, and the row of apertures 372C.

With reference to FIGS. 7–15, 22 and 23, the pressurized fluid supplied to the inlet 110D is directed to the rows of apertures 372D and conditioned or distributed in substantially the same manner as described above with respect to the pressurized fluid supplied to the inlet 110A. More particularly, the fluid supplied to the inlet 110D will flow through the passages 114D, the openings 112D, the apertures 212D, the transverse slots 232D, the apertures 242D, the apertures 312D, the longitudinal slots 322D, the sets of apertures 332D, the longitudinal slots 342D, the apertures 352D, the longitudinal slots of the layer 360 corresponding to the slots 342D, and the rows of apertures 372D.

With reference to FIGS. 7–15, 24 and 25, the pressurized fluid supplied to the inlet 110E is directed to the rows of apertures 372E and conditioned or distributed in substantially the same manner as described above with respect to the pressurized fluid supplied to the inlet 110A. More particularly, the fluid supplied to the inlet 110E will flow through the passages 114E, the openings 112E, the apertures 212E, the transverse slots 232E, the apertures 242E, the apertures 312E, the longitudinal slots 322E, the apertures 332E, the longitudinal slots 342E, the sets of apertures 352E, the longitudinal slots of the layer 360 corresponding to the slots 342E, and the rows of apertures 372E.

Preferably, each of the slots 322A–322E (FIG. 11), the sets of apertures 332A–332E (FIG. 12), the slots 342A–342E (FIG. 13), the sets of apertures 352A–352E (FIG. 14), and the rows of apertures 372A–372E (FIG. 15) has a length of between about 20 and 23 mm.

Figure 3:
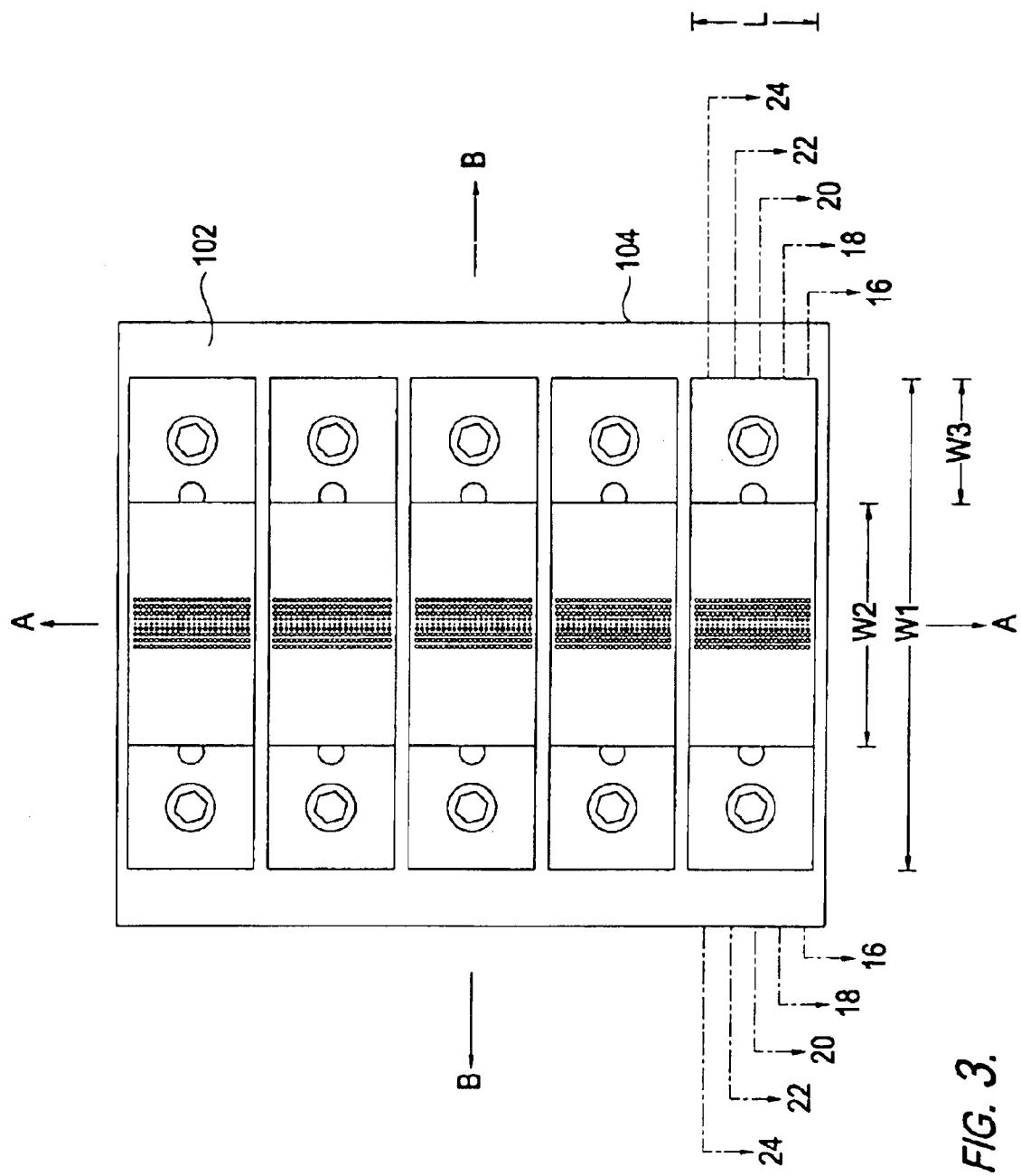
FIG. 3 is a top plan view of the burner assembly of FIG. 1.

Preferably, each of the layers 210, 230, 240 of the adapter 200 has substantially the same length L (FIG. 3) and width W1 (FIG. 3). Preferably, the length L is greater than the width W1. Preferably, the length L is between about 25 and 26 mm.

Preferably, each of the layers 310, 320, 330, 340, 350, 360, 370 of the burner 300 (FIG. 4) has substantially the same width and length. Preferably, the length of the burner layers is substantially the same as the length L (FIG. 3) of the adapter 200. Preferably, the width W2 (FIG. 3) of the burner layers is between about 50 and 60 mm. Preferably, the apertures formed in the distribution layers 330, 350 are formed therein by micromachining. Suitable devices for micromachining such apertures in the layers 330, 350 include an Inductively Coupled Plasma Etch Machine, Model Number 601E, available from ALCATEL.

Preferably, the manifold 100, the adapter 200, and the burner 300 are arranged and configured such that the back pressure present at any given one of the inlets 110A–110E, 120A–120E, 130A–130E, 140A–140E, 150A–150E is no more than 25 psi when a process gas is flowed through the corresponding one of the burner modules 50 and exits through the associated apertures in the burner face layer at a flow rate of 50 slpm (standard liters per minute) of $O_2$ or less.

According to certain preferred embodiments of the present invention, the outer surface of the burner face layer 370 may be covered by a reflective layer. The reflective layer may be a thermally deposited oxide layer. Alternatively, the reflective layer may be a metal reflective layer, such as an evaporatively deposited gold layer.

Figure 27:
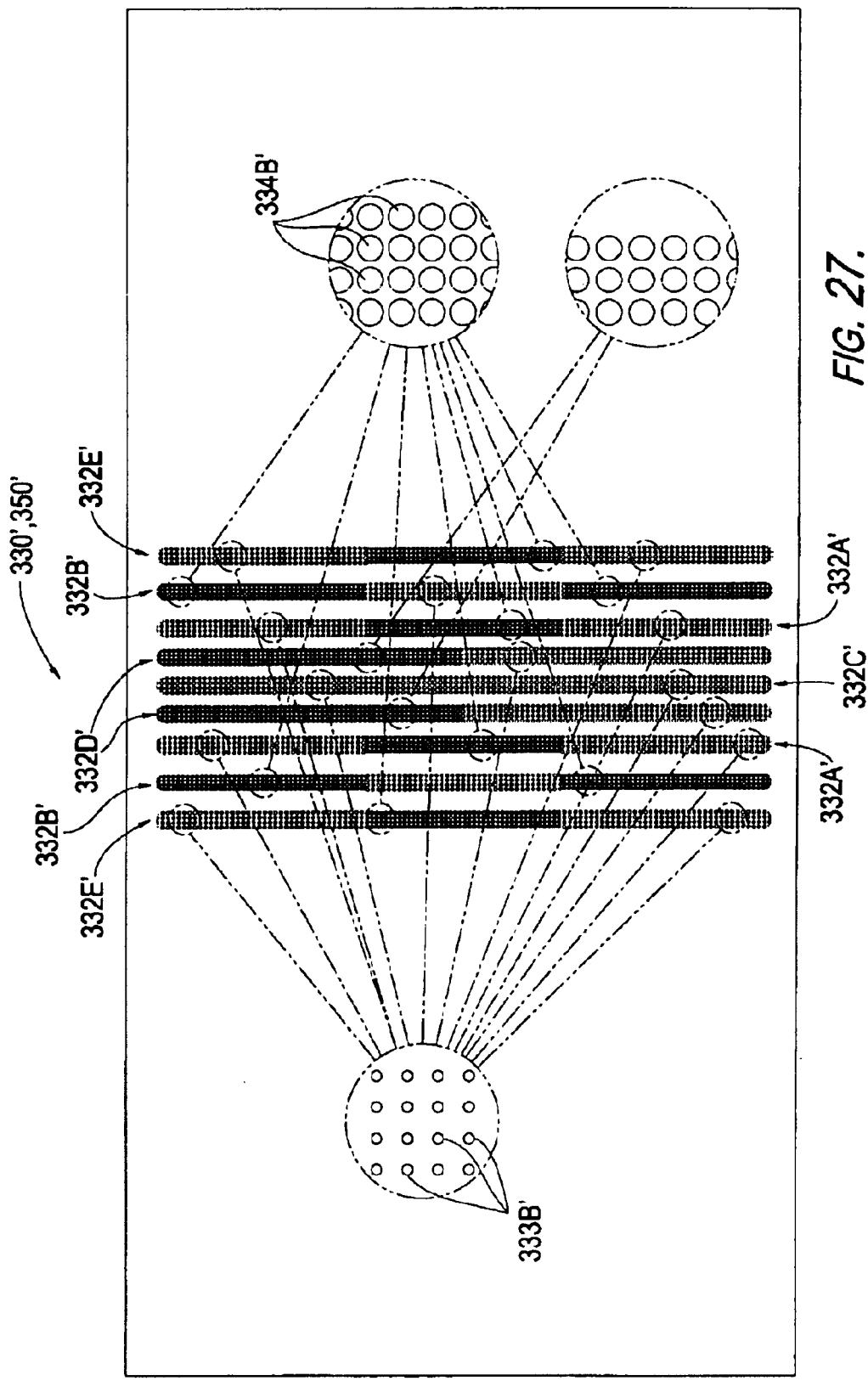
FIG. 27 is a top plan view of a distribution layer according to alternative embodiments of the present invention with enlarged details.

According to further embodiments of the invention, the patterns of the apertures of the distribution layers may be modified to selectively control the distribution of flow of the burner fluids through the module 50. For example, either or both of the distribution layers 330, 350 of the module 50 may be replaced with modified distribution layers 330' and 350', respectively, as shown in FIG. 27. Each of the sets of apertures 332A', 332B', 332D', 332E' of the distribution layers 330', 350' have non-uniform patterns of apertures. For example, the sets 332B' have apertures 334B' of a first size and apertures 333B' of a second, smaller size. Additionally, some of the sets of apertures 332A', 332B', 332C', 332D', 332E' have different patterns of apertures from one another.

Figure 28:
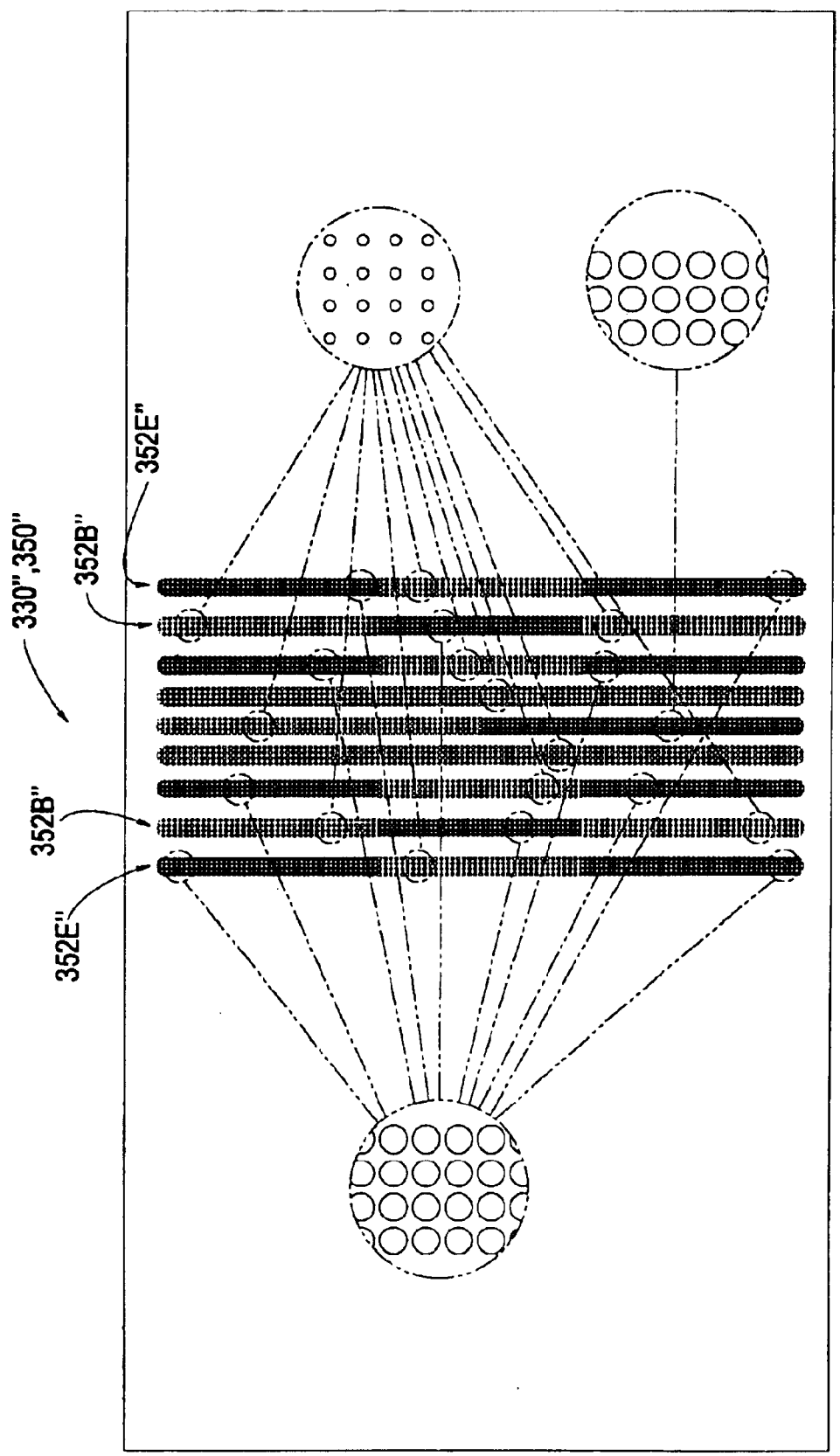
FIG. 28 is a top plan view of a distribution layer according to further alternative embodiments of the present invention with enlarged details.
Figure 29:
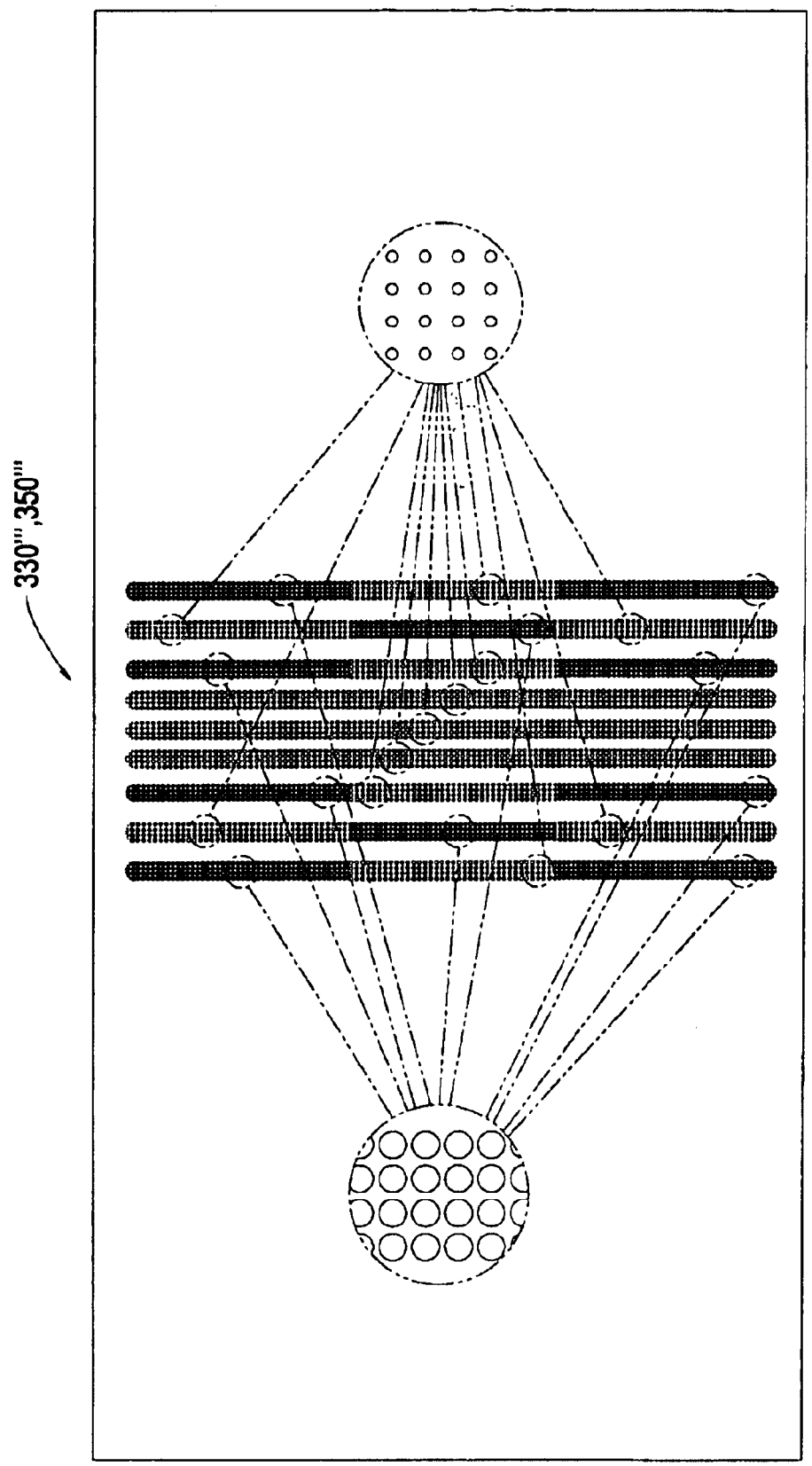
FIG. 29 is a top plan view of a distribution layer according to further alternative embodiments of the present invention with enlarged details.
Figure 30:
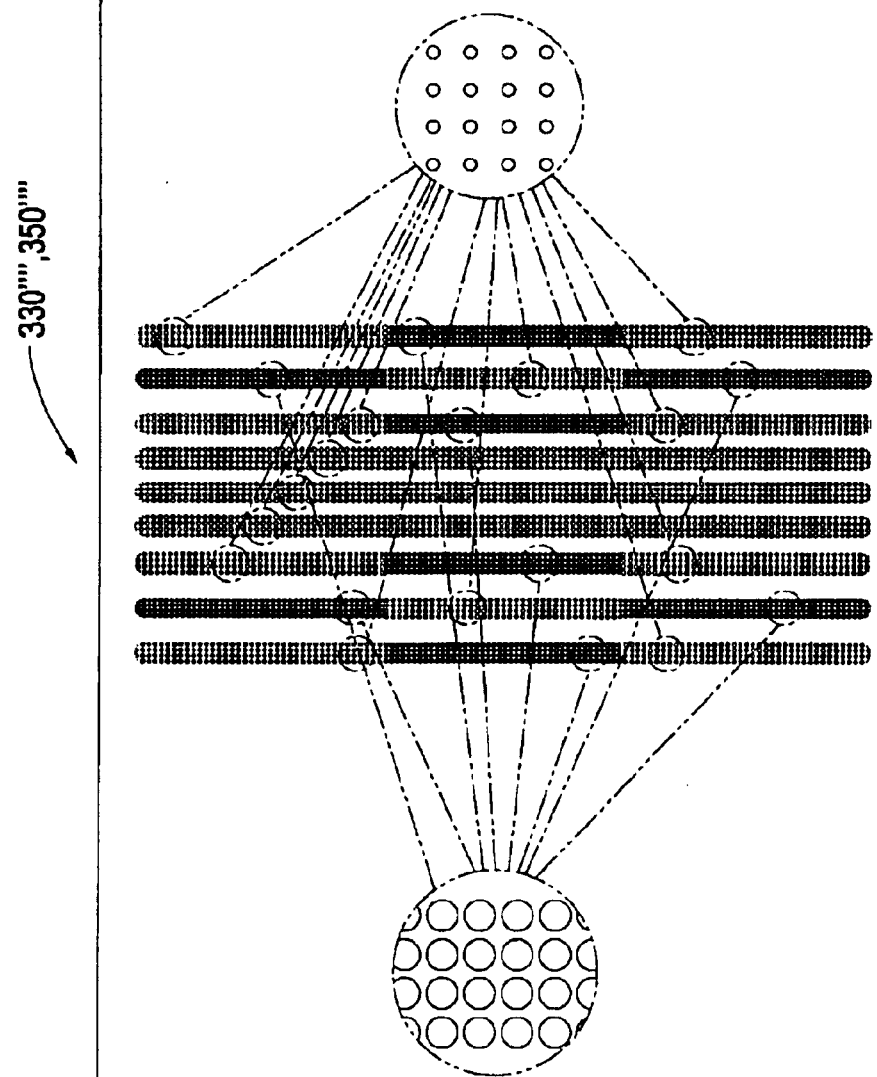
FIG. 30 is a top plan view of a distribution layer according to further alternative embodiments of the present invention with enlarged details.

With reference to FIG. 28, alternative distribution layers 330" and 350" as shown therein may be substituted for the distribution layers 330 and 350, respectively, of the module 50. Further alternative distribution layers which may be used in place of the distribution layers 330, 340 are shown in FIG. 29 (distribution layers 330''', 350''') and FIG. 30 (distribution layers 330'''', 350'''').

The patterns of apertures provided in the distribution layer may be further selected such that one of the distribution layers has at least first and second sets of apertures of a first non-uniform pattern and a second non-uniform pattern, respectively, and another of the distribution layers has third and fourth sets of apertures of third and fourth non-uniform patterns in fluid communication with the first and second sets of apertures, respectively. For example, the distribution layer 330 may be replaced with the distribution layer 330' (FIG. 27) and the distribution layer 350 may be replaced with the distribution layer 350" (FIG. 28). In this case, each of the two non-uniformly patterned set of apertures 332B' fluidly communicates with a respective one of the two non-uniformly patterned sets of apertures 352B" of the layer 350".

Moreover, as illustrated by the exemplary embodiment just described, the first and second non-uniform patterns of apertures in a common distribution layer may be different from one another, and the third and fourth non-uniform patterns in a second, common distribution layer may be different from one another. In the described embodiment, the non-uniform patterns of the sets of apertures 332B' differ from the non-uniform patterns of the sets of apertures 332E' while the non-uniform patterns of the sets of apertures 352B" and 352E" differ from the patterns of the sets of apertures 332B" and 332E", respectively. Such non-uniform patterns in the distribution layer(s) help to make the resulting burner flame emanating from the burner face more uniform across the length thereof. This results in more uniform soot generation and deposition.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A burner module for delivering a flow of chemical reactants to a combustion site of a chemical vapor deposition process, said burner module comprising:

a) a plurality of substantially planar layers arranged in a generally parallel and fixed relationship and defining an inlet, an outlet and a passage fluidly connecting said inlet and said outlet, at least one of said layers being a first distribution layer having a plurality of apertures therethrough and fluidly communicating with said passage;

b) wherein said plurality of apertures collectively define a non-uniform pattern arranged and configured to improve the uniformity of a flow out through said outlet and further including a second distribution layer between said first distribution layer and said inlet, said second distribution layer having a plurality of second apertures therethrough and fluidly communicating with said passage, wherein the average diameter of said apertures of said first distribution layer is less than the average diameter of said second apertures.

2. A burner module for delivering a flow of chemical reactants to a combustion site of a chemical vapor deposition process, said burner module comprising:

a) a plurality of substantially planar layers arranged in a generally parallel and fixed relationship and defining an inlet, an outlet and a passage fluidly connecting said inlet and said outlet, at least one of said layers being a first distribution layer having a plurality of apertures therethrough and fluidly communicating with said passage;

b) wherein said plurality of apertures collectively define a first non-uniform pattern arranged and configured to improve the uniformity of a flow out through said outlet and further including:
a second inlet;
a second outlet;
a second passage fluidly connecting said second inlet and said second outlet; and
a plurality of second apertures formed in said at least one of said layers and fluidly communicating with said second passage;
wherein said plurality of second apertures collectively define a second non-uniform pattern arranged and configured to improve the uniformity of a flow out through said second outlet; and
wherein said first non-uniform pattern is different from said second non-uniform pattern.

3. The burner module of claim 2, wherein said first and second passages do not fluidly intersect with one another.

4. A burner module for delivering a flow of chemical reactants to a combustion site of a chemical vapor deposition process, said burner module comprising:

a plurality of substantially planar layers arranged in a generally parallel and fixed relationship and defining an inlet, an outlet and a passage fluidly connecting said inlet and said outlet, at least one of said layers being a distribution layer having a plurality of apertures therethrough and fluidly communicating with said passage;

wherein said plurality of apertures collectively define a non-uniform pattern arranged and configured to improve the uniformity of a flow out through said outlet, the module further comprising:

a) a substantially planar lower plenum layer having first and second slots formed therein;
b) a substantially planar upper plenum layer having first and second slots formed therein;
c) a burner face layer overlying said upper plenum layer, said burner face layer including at least first and second burner apertures fluidly communicating with said first and second slots of said upper plenum layer, respectively;
d) wherein said distribution layer is interposed between said upper and lower plenum layers and includes:
a plurality of first apertures formed therein and fluidly communicating with said first slots of said upper and lower plenum layers, wherein said plurality of first apertures collectively define a first non-uniform pattern; and
a plurality of second apertures formed therein and fluidly communicating with said second slots of said upper and lower plenum layers, wherein said plurality of second apertures collectively define a second non-uniform pattern; and
e) wherein said first and second non-uniform patterns are arranged and configured to improve the uniformity of a flow through said lower plenum layer, said distribution layer and said upper plenum layer and out through said first and second burner apertures and further including a second distribution layer underlying said lower plenum layer, said second distribution layer including:
a plurality of third apertures formed therein and fluidly communicating with said first slot of said lower plenum layer, wherein said plurality of third apertures collectively define a third non-uniform pattern; and
a plurality of fourth apertures formed therein and fluidly communicating with said second slot of said lower plenum layer, wherein said plurality of fourth apertures collectively define a fourth non-uniform pattern.

5. The burner module of claim 4 wherein said third and fourth non-uniform patterns are different from said first and second non-uniform patterns.

6. A burner mounting adapter for use with a manifold having a mount surface and first and second fluid supply openings in the mount surface and distributed at different locations along a length of the manifold, said burner mounting adapter comprising:

a) an adapter body;
b) a first inlet aperture, a first outlet aperture and a first connecting passage fluidly connecting said first inlet and outlet apertures defined in said adapter body; and
c) a second inlet aperture, a second outlet aperture and a second connecting passage fluidly connecting said second inlet and outlet apertures defined in said adapter body;
d) wherein said first and second inlet apertures are arranged and configured to align with the first and second fluid supply openings, respectively, when said burner mounting adapter is mounted on the mount surface of the manifold; and
e) wherein said first and second passages extend transversely of the manifold length when said burner mounting adapter is mounted on the mount surface of the manifold.

7. The burner mounting adapter of claim 6 wherein said adapter body includes a plurality of substantially planar layers arranged in a generally parallel and fixed relationship.

8. The burner mounting adapter of claim 6 wherein the transverse distance between said first and second outlet apertures is less than the transverse distance between said first and second inlet apertures.

9. The burner mounting adapter of claim 6 wherein said first and second passages do not fluidly intersect with one another.

10. The burner mounting adapter of claim 6 including an integral mounting portion disposed transversely outwardly from said first and second outlet apertures.

11. The burner mounting adapter of claim 10 including a mounting hole in said mounting portion.

12. The burner mounting adapter of claim 6 including:

a) a substantially planar lower adapter layer having said first and second inlet apertures formed therein;

b) a substantially planar intermediate adapter layer having first and second slots formed therethrough, wherein:
   each of said first and second slots extends transversely of the manifold length from a first end to a second end;
   said first inlet aperture is disposed adjacent and in fluid communication with said first end of said first slot; and
   said second inlet aperture is disposed adjacent and in fluid communication with said first end of said second slot; and
c) a substantially planar upper adapter layer overlying said intermediate adapter layer and including said first and second outlet apertures formed therein, wherein:
   said first outlet aperture is disposed adjacent and in fluid communication with said second end of said first slot; and
   said second outlet aperture is disposed adjacent and in fluid communication with said second end of said second slot.

13. The burner mounting adapter of claim 12 wherein said lower adapter layer, said intermediate adapter layer and said upper adapter layer are each formed from a material selected from the group consisting of glass, silicon, silicon carbide, borosilicate glass, polycrystalline silica, ceramic, plastic and photodefinable metal.

14. A burner module for use with a manifold having a mount surface and first and second fluid supply openings in the mount surface and distributed at different locations along a length of the manifold, said burner module comprising:
a) a burner mounting adapter including:
   1) an adapter body;
   2) a first inlet aperture, a first outlet aperture and a first connecting passage fluidly connecting said first inlet and outlet apertures defined in said adapter body; and
   3) a second inlet aperture, a second outlet aperture and a second connecting passage fluidly connecting said second inlet and outlet apertures defined in said adapter body;
   4) wherein said first and second inlet apertures are arranged and configured to align with the first and second fluid supply openings, respectively, when said burner mounting adapter is mounted on the mount surface of the manifold; and
   5) wherein said first and second passages extend transversely of the manifold length when said burner mounting adapter is mounted on the mount surface of the manifold; and
b) a burner face layer overlying said adapter body, said burner face layer including at least first and second burner apertures fluidly communicating with said first and second outlet apertures of said adapter body, respectively.

15. The burner module of claim 14 wherein said burner apertures each have a diameter of between about 100 and 2000 microns.

16. The burner module of claim 15 wherein said burner module provides a back pressure in at least one of said first and second inlet apertures of no more than 25 psi when process gases are flowed through said burner module and exit through said burner apertures at a flow rate of 40 slpm of $O_2$.

17. The burner module of claim 14 wherein said burner mounting adapter includes an integral mounting portion extending transversely beyond said first and second burner apertures.

18. The burner module of claim 17 including a mounting hole in said mounting portion.

19. The burner module of claim 14 wherein said burner mounting adapter includes:
a) a substantially planar lower adapter layer having said first and second inlet apertures formed therein;
b) a substantially planar intermediate adapter layer having first and second slots formed therethrough, wherein:
   each of said first and second slots extends transversely of the manifold length from a first end to a second end;
   said first inlet aperture is disposed adjacent and in fluid communication with said first end of said first slot; and
   said second inlet aperture is disposed adjacent and in fluid communication with said first end of said second slot; and
c) a substantially planar upper adapter layer overlying said intermediate adapter layer and including said first and second outlet apertures formed therein, wherein:
   said first outlet aperture is disposed adjacent and in fluid communication with said second end of said first slot; and
   said second outlet aperture is disposed adjacent and in fluid communication with said second end of said second slot.

20. The burner module of claim 19 further including a flow conditioning assembly, said flow conditioning assembly comprising:
a) a substantially planar plenum layer interposed between said upper adapter layer and said burner face layer, said lower plenum layer having first and second slots formed therein and fluidly communicating with said first and second outlet apertures, respectively; and
b) a substantially planar distribution layer interposed between said upper adapter layer and said burner face layer, said distribution layer including:
   a plurality of first apertures formed therein and fluidly communicating with said first slot of said plenum layer and with said first slot of said intermediate adapter layer; and
   a plurality of second apertures formed therein and fluidly communicating with said second slot of said plenum layer and with said second slot of said intermediate adapter layer.

21. A burner assembly for delivering a flow of chemical reactants to a combustion site of a chemical vapor deposition process, said burner assembly comprising:
a) a manifold including:
   1) a mount surface; and
   2) first and second fluid supply openings in said mount surface and distributed at different locations along a length of said manifold;
b) a burner module comprising:
   1) a burner mounting adapter including:
      i) an adapter body:
      ii) a first inlet aperture, a first outlet aperture and a first connecting passage fluidly connecting said first inlet and outlet apertures defined in said adapter body; and
      iii) a second inlet aperture, a second outlet aperture and a second connecting passage fluidly connecting said second inlet and outlet apertures defined in said adapter body;
      iv) wherein said first and second inlet apertures are arranged and configured to align with the first and second fluid supply openings, respectively, when said burner mounting adapter is mounted on the mount surface of the manifold; and v) wherein said first and second passages extend transversely of the manifold length when said burner mounting adapter is mounted on the mount surface of the manifold; and 2) a burner face layer overlying said adapter body, said burner face layer including at least first and second burner apertures fluidly communicating with said first and second outlet apertures of said adapter body, respectively.

22. The burner assembly of claim 21 including a first fluid supply fluidly connected to said first fluid supply opening through said manifold and a second fluid supply fluidly connected to said second fluid supply opening through said manifold.

23. The burner assembly of claim 22 wherein said first and second fluid supplies are selected from the group consisting of $O_2$, $N_2$, $CH_4$, $H_2$, CO, $SiCl_4$, $GeCl_4$, OMCTS, $CF_4$, $SF_6$, $SiF_4$, $POCl_3$, ERFOD, $AlCl_3$, and TICS.

24. The burner assembly of claim 21 wherein said burner apertures each have a diameter of between about 100 and 2000 microns.

25. The burner assembly of claim 24 wherein said burner apertures each have a diameter of between about 300 and 1000 microns.

26. The burner assembly of claim 21 wherein said burner module provides a back pressure in at least one said first and second inlet apertures of no more than 25 psi when process gases are flowed through the burner module and exit through the burner apertures at a flow rate of 40 slpm of $O_2$.

27. The burner assembly of claim 21 wherein:

said manifold includes a plurality of sets of fluid supply openings in said mount surface and distributed at different locations along said length of said manifold; and said burner assembly includes a plurality of said burner modules each mounted along said length of said manifold over a respective one of said sets of fluid supply openings.

* * * * *